United States Patent
Jin et al.

(10) Patent No.: US 8,972,553 B2
(45) Date of Patent: Mar. 3, 2015

(54) METHOD AND APPARATUS FOR HANDLING POLICY AND CHARGING CONTROL RULE OR QUALITY OF SERVICE RULE MODIFICATION FAILURES

(75) Inventors: Haipeng Jin, Carlsbad, CA (US); Gerardo Giaretta, San Diego, CA (US); Osok Song, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 12/853,164

(22) Filed: Aug. 9, 2010

(65) Prior Publication Data

US 2011/0202647 A1  Aug. 18, 2011

Related U.S. Application Data

(60) Provisional application No. 61/232,729, filed on Aug. 10, 2009.

(51) Int. Cl.
*G06F 15/173* (2006.01)
*H04L 12/24* (2006.01)
*H04L 29/14* (2006.01)
*H04L 29/06* (2006.01)

(52) U.S. Cl.
CPC ......... *H04L 41/0806* (2013.01); *H04L 65/1016* (2013.01); *H04L 65/80* (2013.01); *H04L 69/40* (2013.01)
USPC ............ 709/223; 370/230; 370/329; 455/406

(58) Field of Classification Search
USPC .................... 709/223; 370/230, 329; 455/406
See application file for complete search history.

(56) References Cited

U.S. PATENT DOCUMENTS

2008/0256251 A1*  10/2008  Huotari et al. ................ 709/229
2010/0017846 A1*  1/2010  Huang et al. ..................... 726/1

FOREIGN PATENT DOCUMENTS

| CN | 101222413 A | 7/2008 |
|---|---|---|
| CN | 101272256 A | 9/2008 |
| CN | 101459524 A | 6/2009 |
| EP | 2239884 A1 | 10/2010 |
| WO | WO2009129747 A1 | 10/2009 |

OTHER PUBLICATIONS

3GPP2, "All-IP Core Network Multimedia Domain," Dec. 2007; Version 1.0; pp. 1-36.*

(Continued)

*Primary Examiner* — Thomas Dailey
(74) *Attorney, Agent, or Firm* — Kristine U. Ekwueme

(57) ABSTRACT

Methods and apparatuses are provided that facilitate handling failures in policy rule installation and/or related bearer modification procedures. A set of modified policy rules can be provided to a gateway for enforcement thereof and/or correlation with a bearer of a device. The gateway can attempt to install the modified rules and can utilize a credit control request (CCR)/credit control answer (CCA) exchange to notify of a status of the modified rule installation and/or related bearer modification. A policy charging and rules function (PCRF) can, thus, determine the status based on the CCR/CCA exchange. If the status indicates failure, the PCRF can revert to previous policy rules. In addition, an application function can be notified of the status.

36 Claims, 17 Drawing Sheets

(56) References Cited

OTHER PUBLICATIONS

3rd Generation Partnership Project; Technical Specification Group Core Network and Terminals; Policy and Charging Control signalling flows and QoS parameter mapping; (Release 7), 3GPP Standard; 3GPP TS 29.213, 3rd Generation Partnership Project (3GPP), Mobile Competence Centre ; 650, Route Des Lucioles ; F-06921 Sophia-Antipolis Cedex ; France, No. V7.7.0, Dec. 1, 2008, pp. 1-64, XP050372371.

3rd Generation Partnership Project; Technical Specification Group Services and System Aspects; Policy and charging control architecture (Release 7), 3GPP Standard; 3GPP TS 23.203, 3rd Generation Partnership Project (3GPP), Mobile Competence Centre ; 650, Route Des Lucioles ; F-06921 Sophia-Antipolis Cedex ; France, No. V7.11.0, Jun. 1, 2009, pp. 1-75, XP050363020.

International Search Report and Written Opinion—PCT/US2010/045097, International Search Authority—European Patent Office—Dec. 13, 2010.

Qualcomm Europe: "PCC QoS rule modification failure handling", 3GPP Draft; C3-090909 (29.212), 3rd Generation Partnership Project (3GPP), Mobile Competence Centre ; 650, Route Des Lucioles ; F-06921 Sophia-Antipolis Cedex ; France, [Online] XP002612076, Retrieved from the Internet: URL:http://www.3gpp.org/ftp/tsg_ct/WG3_int erworki ng_ex-CN3/TSGC3_54_Seville/Docs/C3- 090909.zip> [retrieved on Nov. 26, 2010].

3GPP Standard; 3GPP TS 29.213, 3rd Generation Partnership Project (3GPP) V7.8.0, 3GPP; Technical Specification Group Core Network and Terminals; Policy and Charging Control signalling flows and QoS parameter mapping; (Release 7), Mobile Competence Centre ; 650, Route Des Lucioles ; F-06921 Sophia-Antipolis Cedex ; France, No. V7.8.0, Mar. 2009, pp. 1-64.

Camiant: "Update to IP-CAN Session Modification ACK step", 3GPP TSG-SA2 Meeting #69 S2-087762, Nov. 21, 2008.

Huawei: "PCC Control in Non-optimized Handover", 3GPP TSG SA WG2 Meeting #66 TD S2-084488, pp. 1-2, Jun. 27, 2008.

Taiwan Search Report—TW099126652—TIPO—Sep. 24, 2013.

\* cited by examiner

US 8,972,553 B2

METHOD AND APPARATUS FOR HANDLING POLICY AND CHARGING CONTROL RULE OR QUALITY OF SERVICE RULE MODIFICATION FAILURES

CLAIM OF PRIORITY UNDER 35 U.S.C. §119

The present application for patent claims priority to Provisional Application No. 61/232,729 entitled "METHOD AND APPARATUS FOR HANDLING POLICY AND CHARGING CONTROL RULE OR QoS RULE MODIFICATION FAILURES" filed Aug. 10, 2009, and assigned to the assignee hereof and hereby expressly incorporated by reference herein.

BACKGROUND

1. Field

The following description relates generally to wireless communications, and more particularly to policy and charging control (PCC) and/or quality of service (QoS) rule modification.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices in a wireless network can communicate with one or more core network components for authentication and/or authorization to access the wireless network. For example, a policy charging and rules function (PCRF) can be implemented within one or more of the core network components (e.g., an internet protocol (IP) multimedia subsystem (IMS), etc.) for providing policy control and charging (PCC) rules, quality of service (QoS) rules, and/or the like, for one or more devices. In an example, a device can establish a bearer in the wireless network for communicating therewith, and the PCRF can assign policy rules (e.g., PCC rules, QoS rules, etc.) to the bearer depending on a type data to be communicated over the bearer, subscriber information related to the device, and/or the like The policy rules can be enforced over the bearer by one or more disparate components, such as a policy charging and enforcement function (PCEF), which can be implemented by one or more gateways. In addition, the one or more gateways can implement other components to manage the bearer and/or correlate the bearer with the policy rules, such as a bearer binding and event reporting function (BBERF), and/or the like. Upon bearer modification, the PCRF can generate or otherwise receive modified policy rules and can provide the new policy rules to the one or more disparate components for enforcing on the bearer. In some cases, however, the one or more disparate components may not be able to install the modified policy rules or complete modification of the bearer according to the modified policy rules.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating handling policy and charging control (PCC) and/or quality of service (QoS) rule modification failure at one or more wireless network components. For example, where a network component fails to install modified policy rules, such as PCC and/or QoS rules, related to a bearer, a policy charging and rules function (PCRF) can be notified and can revert to previous policy rules. In one example, such notification can entail receiving a message from the one or more wireless network components reporting success or failure of implementing the modified policy rules, utilizing a timer to determine whether the modified policy rules are properly installed at the one or more network components, etc. In addition, for example, the PCRF can notify an application function related to the bearer of failed or successful policy rule modification.

According to an aspect, a method is provided that includes providing one or more modified policy rules to a gateway based at least in part on a bearer modification procedure and determining whether the gateway successfully completes the bearer modification procedure installing the one or more modified policy rules. The method also includes utilizing the one or more modified policy rules or one or more previous policy rules based at least in part on the determining whether the gateway successfully completes the bearer modification procedure.

In another aspect, a wireless communications apparatus is provided that includes at least one processor configured to communicate one or more modified policy rules to a gateway based at least in part on a bearer modification procedure and determine whether the gateway successfully installs the one or more modified policy rules and completes the bearer modification procedure. The at least one processor is further configured to utilize the one or more modified policy rules or one or more previous policy rules based at least in part on whether the gateway successfully installs the one or more modified policy rules and completes the bearer modification procedure. In addition, the wireless communications apparatus includes a memory coupled to the at least one processor.

In yet another aspect, an apparatus is provided that includes means for providing one or more modified policy rules to a gateway based at least in part on a bearer modification procedure and means for determining whether the gateway successfully completes the bearer modification procedure installing the one or more modified policy rules. The apparatus further includes means for reverting to one or more previous policy rules, wherein the means for determining determines that the gateway did not successfully complete the bearer modification procedure.

Still, in another aspect, a computer-program product is provided that includes a computer-readable medium having code for causing at least one computer to communicate one or more modified policy rules to a gateway based at least in part on a bearer modification procedure and code for causing the at least one computer to determine whether the gateway successfully installs the one or more modified policy rules and completes the bearer modification procedure. The computer-readable medium further includes code for causing the at least one computer to utilize the one or more modified policy rules or one or more previous policy rules based at least in part on whether the gateway successfully installs the one or more modified policy rules and completes the bearer modification procedure.

Moreover, in an aspect, an apparatus is provided that includes a rules provisioning component that provides one or more modified policy rules to a gateway based at least in part on a bearer modification procedure and a modifying status receiving component that determines whether the gateway successfully completes the bearer modification procedure installing the one or more modified policy rules. The apparatus further includes a rules reverting component that reverts to one or more previous policy rules, wherein the modifying status receiving component determines that the gateway did not successfully complete the bearer modification procedure.

According to another aspect, a method is provided that includes receiving one or more modified policy rules from a PCRF based at least in part on a bearer modification procedure and attempting to install the one or more modified policy rules as part of the bearer modification procedure. The method further includes transmitting a CCR to the PCRF to indicate whether the bearer modification procedure successfully completed.

In another aspect, a wireless communications apparatus is provided that includes at least one processor configured to obtain one or more modified policy rules from a PCRF based at least in part on a bearer modification procedure and install the one or more modified policy rules as part of the bearer modification procedure. The at least one processor is further configured to transmit a CCR to the PCRF to indicate whether the bearer modification procedure successfully completed. In addition, the wireless communications apparatus includes a memory coupled to the at least one processor.

In yet another aspect, an apparatus is provided that includes means for receiving one or more modified policy rules from a PCRF based at least in part on a bearer modification procedure and means for attempting to install the one or more modified policy rules as part of the bearer modification procedure. The apparatus further includes means for transmitting a CCR to the PCRF to indicate whether the bearer modification procedure successfully completed.

Still, in another aspect, a computer-program product is provided that includes a computer-readable medium having code for causing at least one computer to obtain one or more modified policy rules from a policy charging and rule function (PCRF) based at least in part on a bearer modification procedure and code for causing the at least one computer to install the one or more modified policy rules as part of the bearer modification procedure. The computer-readable medium further includes code for causing the at least one computer to transmit a CCR to the PCRF to indicate whether the bearer modification procedure successfully completed.

Moreover, in an aspect, an apparatus is provided that includes a rules receiving component that obtains one or more modified policy rules from a PCRF based at least in part on a bearer modification procedure and a rules modifying component that attempts to install the one or more modified policy rules as part of the bearer modification procedure. The apparatus further includes a modifying status communicating component that transmits a CCR to the PCRF to indicate whether the bearer modification procedure successfully completed.

According to yet another example, a method is provided that includes receiving a request for additional or modified services from a device and generating new service information for a policy charging and rules function (PCRF) based at least in part on the request. The method also includes transmitting the new service information to the PCRF along with a rules behavior indicator that specifies one or more actions to take if a bearer modification procedure related to the new service information fails.

In another aspect, a wireless communications apparatus is provided that includes at least one processor configured to obtain a request for additional or modified services from a device and generate new service information for a PCRF to facilitate providing resources related to the request. The at least one processor is further configured to transmit the new service information to the PCRF with a rules behavior indicator that specifies one or more actions to perform where a bearer modification procedure related to the new service information fails. In addition, the wireless communications apparatus includes a memory coupled to the at least one processor.

In yet another aspect, an apparatus is provided that includes means for transmitting new service information to a PCRF based at least in part on a request for additional or modified services from a device. The apparatus further includes means for transmitting a rules behavior indicator that specifies one or more actions to take if a bearer modification procedure related to the new service information fails to the PCRF.

Still, in another aspect, a computer-program product is provided that includes a computer-readable medium having code for causing at least one computer to obtain a request for additional or modified services from a device and code for causing the at least one computer to generate new service information for a PCRF to facilitate providing resources related to the request. The computer-readable medium further includes code for causing the at least one computer to transmit the new service information to the PCRF with a rules behavior indicator that specifies one or more actions to perform where a bearer modification procedure related to the new service information fails.

Moreover, in an aspect, an apparatus is provided that includes a new service provisioning component that transmits new service information to a policy charging and rules function (PCRF) based at least in part on a request for additional or modified services from a device. The apparatus further includes a new service provisioning component that transmits new service information to a PCRF based at least in part on a request for additional or modified services from a device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
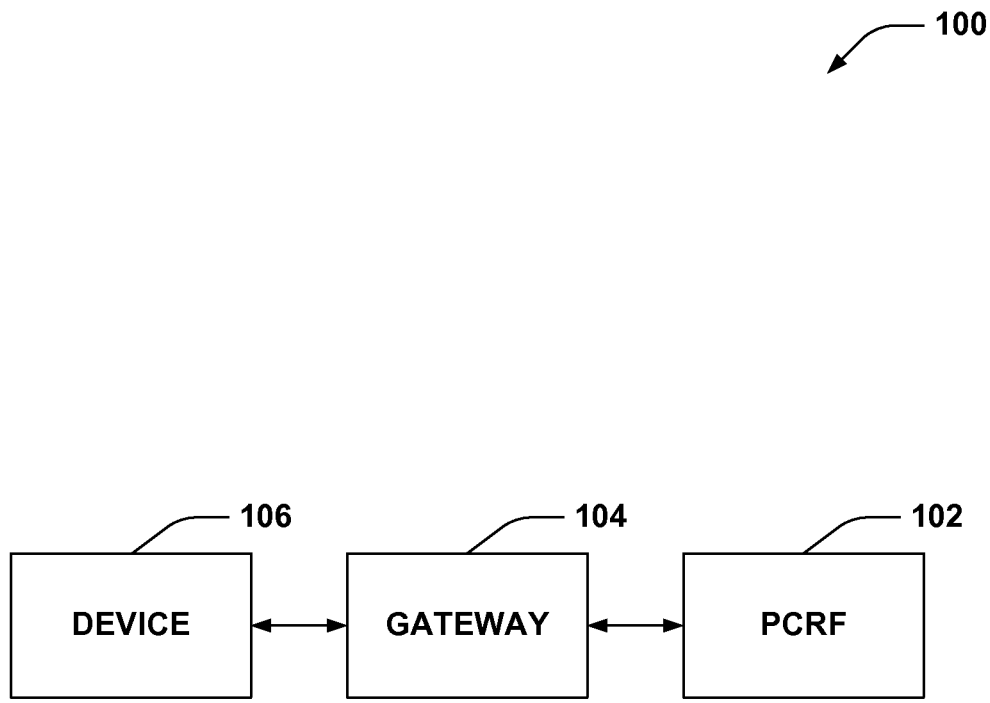
FIG. 1 illustrates an example system for enforcing policy rules for a device communicating in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, policy rules related to a device or corresponding bearer can be updated to allow for modified policy and charging control (PCC), quality of service (QoS), and/or the like. A policy and charging rules function (PCRF) can provide modified rules to a gateway for enforcement thereof and/or association with a specific bearer. Where the gateway fails to properly install the modified policy rules and/or complete bearer modification in view of the rules, the gateway can communicate such failure to the PCRF (as part of a credit control request (CCR)/credit control answer (CCA) exchange, in one example). Thus, the PCRF can utilize this indication to determine whether to continue using the modified rules or revert to a previous version of policy rules.

In addition, the PCRF can notify an application function of the failure, and the application function can accordingly perform an action in response to the failure (e.g., tear down the session, continue at a suboptimal QoS, revert to previous services, and/or the like). Moreover, for example, the application can specify an action to be taken by the PCRF where installation of the modified rules fails. The PCRF can pass the specified action to the gateway as well, for example.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 for implementing and enforcing PCC, QoS, and/or similar policy rules for a device in a wireless network. System 100 includes a PCRF 102 that generates or otherwise receives policy rules (e.g., PCC, QoS, or similar rules) related to a device in the network or a corresponding bearer established between the device and the network. System 100 also includes a gateway 104 that facilitates forwarding communications from a device 106 to one or more components of a wireless network (e.g., a serving gateway (SGW), packet data network (PDN) gateway (PGW), and/or the like in LTE, etc.). It is to be appreciated that additional components can be present in system 100 to facilitate communication among PCRF 102, gateway 104, and device 106. For example, device 106 can be a wireless device, UE, etc. that communicates directly with an access point, eNB, etc. to receive access to gateway 104 (e.g., through one or more additional access points or relay nodes, one or more additional gateways, one or more additional UEs in peer-to-peer mode, and/or the like). In another example device 106 can be an access point, relay node, or other device. In addition, it is to be appreciated that there can be multiple gateways or other components between gateway 104 and PCRF 102.

According to an example, PCRF 102 can be implemented within an internet protocol (IP) multimedia subsystem (IMS) or similar component of a wireless network and can define policies for the IMS or other backend components of the wireless network to control access from one or more devices. For example, device 106 can establish communications with gateway 104 and PCRF 102 by establishing one or more bearers in the wireless network over which data can be communicated from the wireless network to device 106. PCRF 102 can assign policy rules to the bearer that associate subscriber- or data-specific information of device 106 with the bearer, such as charging (e.g., per minute, per kilobyte, etc.), resource restrictions or allowances (e.g., related to the subscriber and/or type of data requested), and/or the like.

In one example, gateway 104 can implement a policy charging and enforcement function (PCEF), that can assist in enforcing the policy rules over the bearer related to device 106, a bearer binding and event reporting function (BBERF) that can modify the bearer of device 106 according to the policy rules, and/or the like. It is to be appreciated that device 106 can have multiple bearers in the wireless network managed by gateway 104 or one or more disparate components, and PCRF 102 can associate a set of policy rules with each bearer, which gateway 104 utilizes at least in part to manage the multiple bearers.

In an example, PCRF 102 can modify policy rules for one or more bearers related to device 106. For example, this can be based at least in part on a resource modification procedure initiated by device 106 (e.g., modifying a bearer to be a voice bearer for voice calls rather than for receiving data). Gateway 104 can receive a related request from device 106 and can forward the request to PCRF 102. Where PCRF 102 authorizes the request, it can determine to modify policy rules related to the bearer. PCRF 102, for example, can update policy rules related to the bearer and can provide the modified policy rules or related information to gateway 104. This can be referred to a pull mode of requesting new policy rules from PCRF 102 from gateway 104. In this example, gateway 104 can install and/or correlate the modified policy rules with the bearer (e.g., using the PCEF, BBERF, etc.) related to device 106, and can enforce the policy rules for communications from device 106. In one example, however, gateway 104 can fail to install the modified policy rules and/or complete a related bearer modification procedure. In this case, gateway 104 can notify PCRF 102 of the failure, and PCRF can revert to a previous version of the PCC, QoS, and/or other policy rules, in one example.

In one example, gateway 104 can transmit a message to PCRF 102 to notify of the failed policy rule installation and/or bearer modification. In this regard, PCRF 102, upon receiving the message, can revert to the previous version of the policy rules. For example, gateway 104 can also notify PCRF 102 of successful policy rule installation and/or bearer modification, in which case PCRF 102 can continue to utilize the modified policy rules. In another example, PCRF 102 can initialize a timer upon providing the modified policy rules to gateway 104. Where gateway 104 does not send a failure message to PCRF 102 before expiration of the timer, PCRF 102 can continue to utilize the modified rules. Similarly, in another example, PCRF 102 can utilize the timer to indicate failed policy rule install and/or bearer modification, such that where PCRF 102 does not receive a message from gateway 104 indicating successful policy rule installation and/or bearer modification, PCRF 102 can revert to the previous policy rules. In another example, PCRF 102 can update policy rules based at least in part on information received from an application function related to the bearer. In this example, PCRF 102 can provide the policy rules to gateway 104, which can be referred to as a push mode, and can report failure and/or success of policy rule installation and/or bearer modification received from gateway 104 to the application function.

Figure 2:
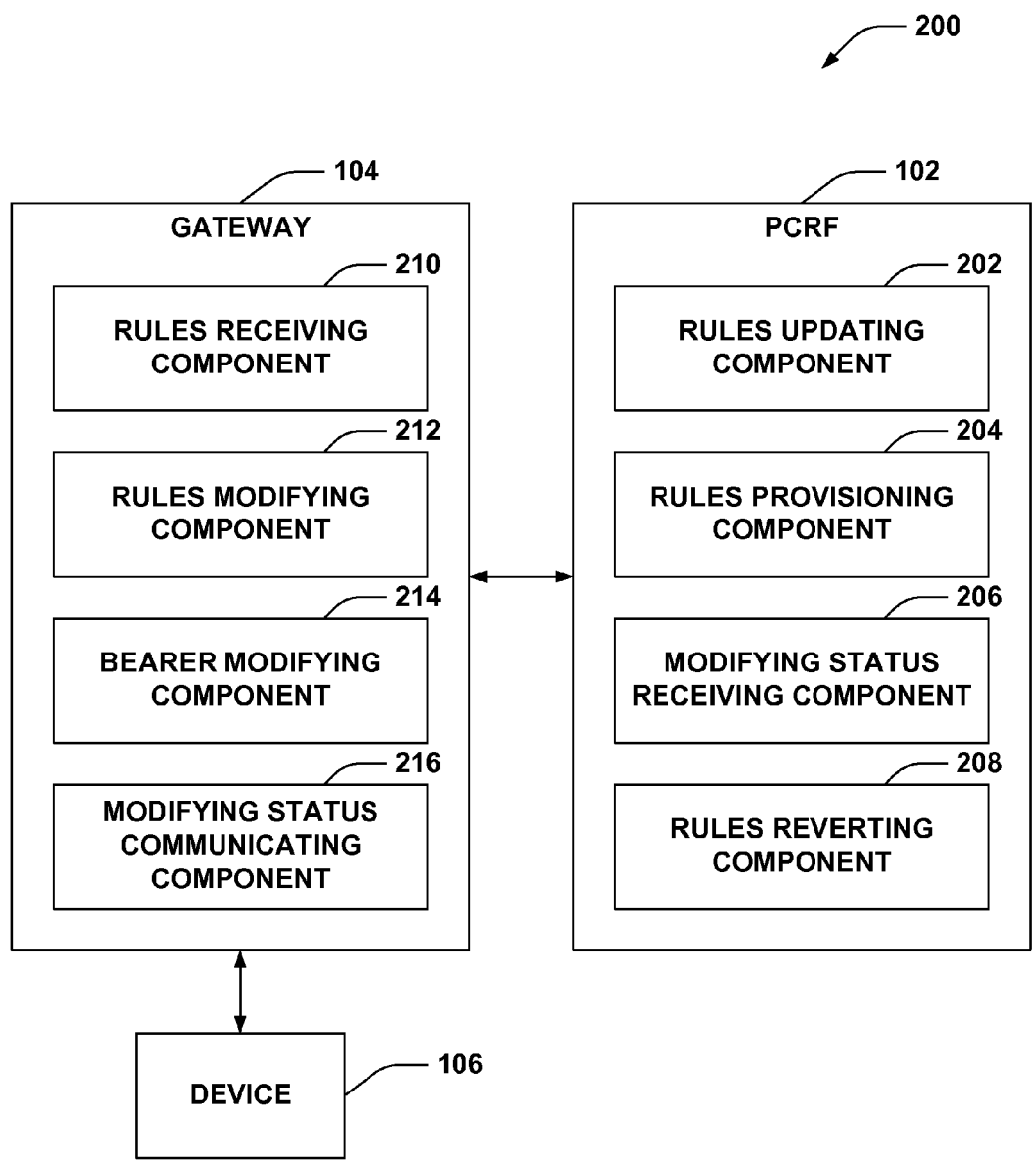
FIG. 2 illustrates an example system for indicating a status of policy rule installation and/or related bearer modification.

Turning to FIG. 2, illustrated is an example wireless communications network 200 that handles failure in PCC, QoS, and/or similar rule updating. Network 200 can include a PCRF 102 that implements policy control for a device 106 or a related bearer, and a gateway 104 that facilitates communications between device 106 and PCRF 102, enforce the policy control, and/or the like, as described. Additionally, as described, gateway 104 can be a SGW, PGW, or other gateway in a wireless network. Moreover, device 106 can be a wireless device, such as a UE, an access point, relay node, or other device, as described, that communicates in a wireless network and is authorized or authenticated via PCRF 102.

PCRF 102 can comprise a rules updating component 202 that generates or otherwise receives a set of modified policy rules related to a device in the wireless network and/or a bearer thereof, and a rules provisioning component 204 that provides the modified policy rules to a gateway with which the device communicates. PCRF 102 can additionally comprise a modifying status receiving component 206 that obtains at least an indication of whether the gateway successfully installed the modified policy rules and/or completed a related bearer modification, and a rules reverting component 208 that updates policy rules to a previous version where the gateway indicates failure for installing the modified policy rules and/or completing the related bearer modification.

Gateway 104, for example, comprises a rules receiving component 210 that obtains a set of modified policy rules from a PCRF, and a rule modifying component 212 that installs the set of modified policy rules for a device and/or a related bearer. Gateway 104 can also comprise a bearer modifying component 214 that performs a bearer modification, which can be requested from the device, and a modifying status communicating component 216 that can report a status of installing the modified policy rules and/or modifying the bearer to the PCRF.

According to an example, as described, PCRF 102 can define or otherwise receive policy rules (e.g., PCC, QoS, or similar rules) for a bearer established in the wireless network for device 106 communications, and gateway 104 can enforce the policy rules for the bearer. Rules updating component 202 can modify the policy rules related to the bearer. In one example, as described, device 106 can initiate a resource modification procedure for the bearer or another resource with gateway 104, which can forward the request to PCRF 102. In this example, where PCRF 102 authorizes the request, rules updating component 202 can modify the policy rules based at least in part on the request to handle and/or appropriately institute policies for data sent over the bearer. For example, rules updating component 202 can define rules for a higher QoS to facilitate allocating more resources to the bearer, define additional charging policies, and/or the like. Moreover, for example, rules provisioning component 204 can transmit the modified policy rules to gateway 104.

In an example, bearer modifying component 214 can initiate bearer modification for device 106 upon receiving the modified policy rules from PCRF 102 (e.g., in LTE), upon receiving an authorization for bearer modification from PCRF 102 (e.g., in evolved high rate packet data (eHRPD)), etc. In either case, for example, rules receiving component 210 can obtain the modified policy rules relating to the bearer, as described, and rules modifying component 212 can attempt to install or correlate the modified policy rules for the bearer of device 106. In one example, rules modifying component 212 can fail to properly install the modified policy rules. Thus, bearer modifying component 214 can also fail to complete the bearer modification procedure. It is to be appreciated, in another example, that bearer modifying component 314 can fail to complete the bearer modification procedure for another reason. In either case, modifying status communicating component 216 can indicate to PCRF 102 that the policy rules were not properly installed by gateway 104 and/or the bearer modification procedure was not completed, and gateway 104 can continue using the previous version of the policy rules. Modifying status receiving component 206 can obtain the indication, and rules reverting component 208 can update the policy rules to the previous version for the bearer of device 106. In this regard, gateway 104 can continue enforcing the previous version of the rules over the bearer.

Thus, in one example, upon receiving a bearer modification request from device 106, gateway can transmit a CCR to PCRF 102 to initiate bearer modification. Rules updating component 202 can generate or otherwise receive a set of policy rules for the bearer, and rules provisioning component 204 can transmit the new policy rules or related information to gateway 104 in a CCA. Moreover, rules reverting component 208 can store the previous version of the policy rules in case install or bearer modification fails at gateway 104. In this regard, for example, PCRF 102 and gateway 104 can exchange another CCR/CCA to indicate whether the new policy rules are successfully installed at gateway 104 or not and/or whether the bearer modification completed successfully or not. For example, rules modifying component 212 can attempt to install the modified policy rules, and bearer modifying component 214 can attempt to complete bearer modification, as described.

In this example, modifying status communicating component 216, in one example, can transmit a CCR to PCRF 102 following the policy rules operation indicating status of the modified policy rules installation and/or bearer modification. Modifying status receiving component 206 can obtain the indicated status. Where the status indicates that gateway 104 successfully installed the policy rules and/or completed bearer modification, rules reverting component 208 can delete the previous policy rules. Thus, PCRF 102 utilizes the modified policy rules in for communications over the bearer related to device 106. Where the status indicates that policy rule installation and/or bearer modification failed at gateway 104, for example, rules reverting component 208 can revert PCRF 102 to the previous version of the policy rules for communications over the bearer related to device 106. It is to be appreciated, in this example, that gateway 104 continues to enforce the previous version of the policy rules since the new policy rules failed to install (or the bearer modification failed). In either case, rules provisioning component 204 can transmit a CCA acknowledging receipt of the status indication to gateway 104.

In another example, rules reverting component 208 does not store the previous version of the policy rules upon rules updating component 202 modifying the policy rules used by PCRF 102. In this example, where policy rules installation or bearer modification fails at gateway 104, modifying status communicating component 216 can include the previous version of the policy rules with the indicated failure status to PCRF 102. Modifying status receiving component 206 can obtain the failure status and the previous version of the policy rules, and rules reverting component 208 can update the policy rules at PCRF 102 to the previous version.

In yet another example, whether or not rules reverting component 208 stores the previous version of the policy rules when rules updating component 202 modifies the policy rules of PCRF 102, rules reverting component 208 can additionally initialize a timer (e.g., once rules updating component 202 modifies the policy rules used by PCRF 102 for the bearer, once rules provisioning component 204 transmits the modified policy rules to gateway 104, etc.). In this regard, where policy rules installation and/or bearer modification fail at gateway 104, as described, modifying status communicating component 216 can transmit the CCR to PCRF 102. Modifying status receiving component 206 can obtain the CCR and interpret as failure at gateway 104 (regardless of the contents of the CCR, in one example), and rules reverting component 208 can update the policy rules of PCRF 102 to the previous version (whether stored or received in the CCR).

In this example, where gateway 104 successfully installs the policy rules and/or successfully modifies the bearer, it does not send a CCR to PCRF 102. Therefore, where the timer at rules reverting component 208 expires before modifying status receiving component 206 receives a CCR from gateway 104, rules reverting component 208 can assume the policy rules are successfully installed and the bearer is successfully modified at gateway 104. Thus, for example, if rules reverting component 208 stored the previous version of the policy rules, it can delete the policy rules. It is to be appreciated that the timer can be utilized in the converse case as well, such that gateway 104 transmits a CCR only on successful rule installation and/or bearer modification, and thus rules reverting component 208 only reverts to the previous policy rules where a CCR is received before expiration of the timer. It is to be appreciated that rules reverting component 208 can set the timer value based at least in part on a configured or otherwise specified value, a value computed based on historical successful policy rule installations and/or bearer modifications, etc.

Figure 3:
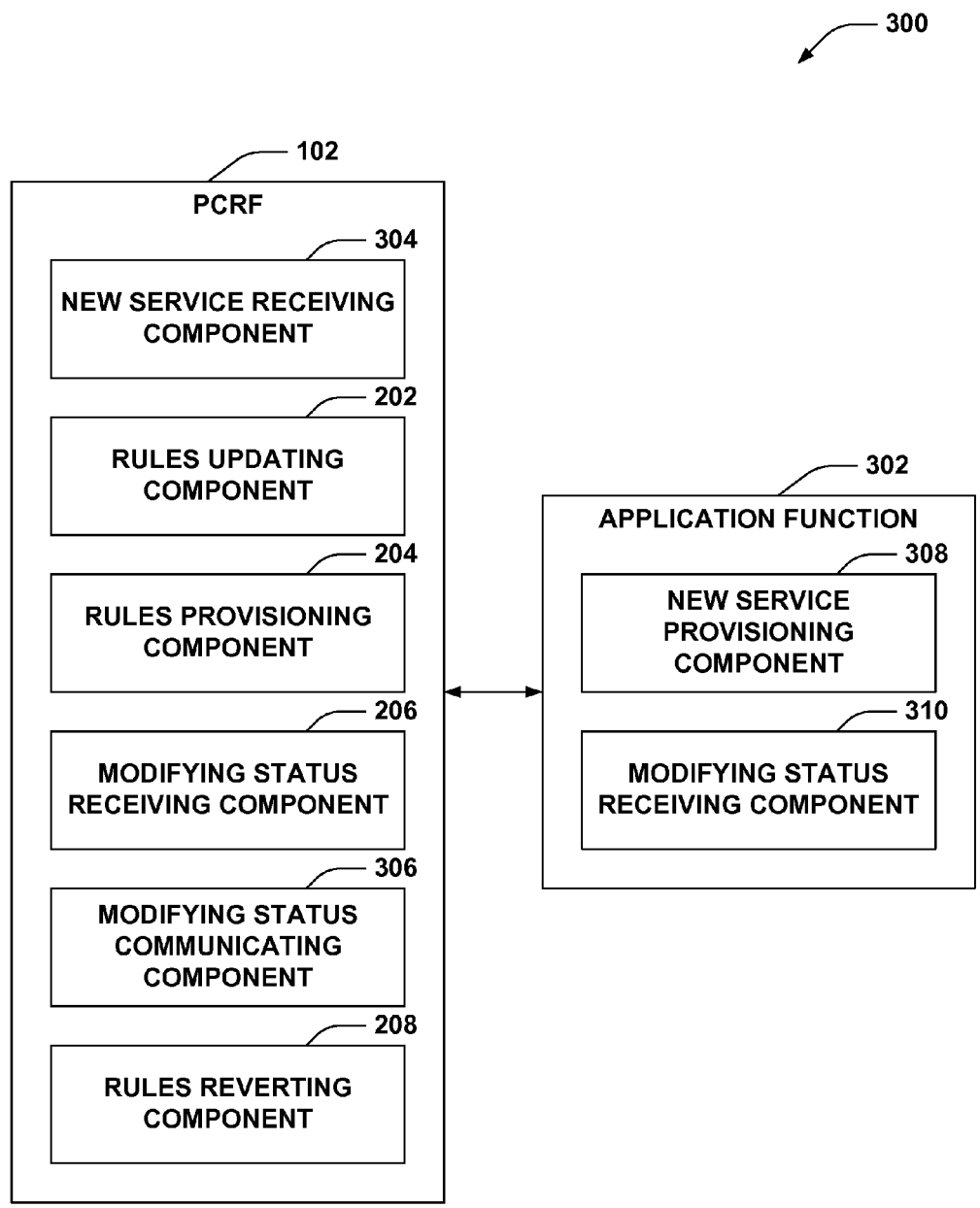
FIG. 3 illustrates an example system that facilitates notifying an application function of a policy rule installation and/or bearer modification status.

Referring to FIG. 3, an example wireless communications network 300 that notifies an application function of failure in policy rule modification is shown. Network 300 can include a PCRF 102 that implements policy control for a device (not shown) or a bearer thereof, as described. Network 300 additionally includes an application function 302 that communicates data over the bearer to the device through PCRF 102 (e.g., and/or a gateway or other core network node). Application function 302, for example, can operate on a network server or similar component to serve a number of devices, and PCRF 102 can control policy, QoS, etc. for the application function 302. In one example, application function 302 can provide service information to the PCRF for implementing PCC, QoS, or similar rules for a device or related bearer.

PCRF 102 can comprise a new service receiving component 304 that obtains one or more new service parameters from an application function related to communicating with a device over a bearer in the wireless network, a rules updating component 202 that modifies one or more policy rules at PCRF 102 based at least in part on the one or more new service parameters, and a rules provisioning component 204 that transmits the one or more modified PCC, QoS, or similar policy rules to a gateway (not shown), which can implement a PCEF and/or BBERF, for enforcing the policy rules and/or modifying the bearer according to the policy rules. PCRF 102 can also comprise a modifying status receiving component 206 that obtains an indication of whether policy rule installation and/or bearer modification succeeded at the gateway, as described, a modifying status communicating component 306 that communicates the indication to the application function, and a rules reverting component 208 that updates the one or more PCC, QoS, or similar policy rules to a previous version where the indication specifies that policy rule installation and/or bearer modification failed at the gateway.

Application function 302 comprises, for example, a new service provisioning component 308 that can provide one or more new service parameters to a PCRF or other core component of a wireless network, and a modifying status receiving component 310 that can obtain an indication from the PCRF of whether policy rules were properly installed at the PCRF, and/or related nodes, that correspond to the one or more new service parameters.

According to an example, application function 302 can generate new service parameters related to a device. For example, the device can request additional or modified services from the application function (e.g., requesting streaming video from an application that previous streamed audio to the device, etc.). Application function 302, in this example, can create one or more new service parameters related to a bearer over which it communications to device based at least in part on the request. New service provisioning component 308 can transmit the one or more new service parameters to PCRF 102. The new service parameters, for example, can relate to additional resources or QoS required for the bearer, policies for charging the device for the requested services, and/or the like. New service receiving component 304 can obtain the one or more new service parameters. In an example, new service receiving component 304 can acknowledge receipt of the one or more new service parameters to application function 302.

In this example, rules updating component 202 can generate a set of modified policy rules (e.g., PCC, QoS, or similar rules) based at least in part on the one or more new service parameters. For example, modified policy rules can be defined to allow for sufficient QoS for the requested services. Rules provisioning component 204, as described, can provide the set of modified policy rules to a gateway or other component that implements an enforcement function, such as a PCEF, a bearer managing function, such as a BBERF, etc. Moreover, as described, modifying status receiving component 206 can obtain an indication of whether the set of modified policy rules were successfully installed at the gateway, whether the bearer related to the device was successfully modified in view of the set of modified policy rules, and/or the like. Where the indication specifies that policy rule installation and/or bearer modification failed at the gateway (and thus the gateway can utilize the old policy rules instead), as described, rules reverting component 208 can update the policy rules at PCRF 102 to the previous version of the policy rules (which can have been stored at rules reverting component 208 or received in the indication, as described).

Furthermore, in this example, modifying status communicating component 306 can notify application function 302 of the failure in utilizing the set of modified policy rules related to the one or more new service parameters. Modifying status receiving component 310 can obtain the notification from PCRF 102, and application function 302 can take action according to the notification. For example, where application function 302 stores the previous service information and/or uses a pre-condition type mechanism, it can utilize the previous service information upon receiving the notification. Where no pre-condition type mechanism is used, for example, application function 302 can tear down the communication session with the device, continue with the new service information using suboptimal QoS, and/or the like. In another example, it is to be appreciated that modifying status communicating component 306 can also notify application function 302 of successful policy rules install and/or bearer modification (e.g., whether it receives such indication from the gateway or infers such based on not receiving an indication to the contrary, as described).

Figure 4:
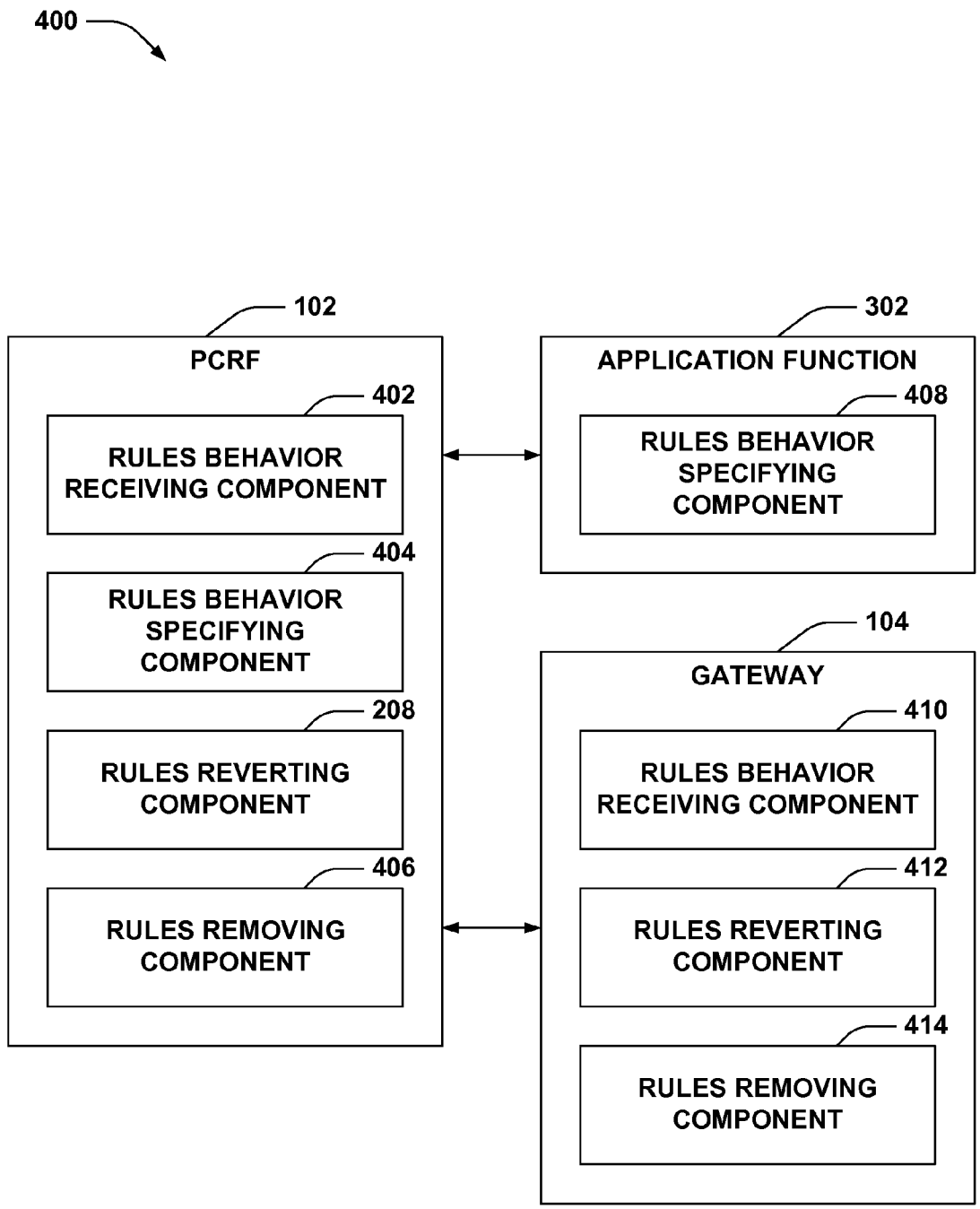
FIG. 4 illustrates an example system for communicating a rules behavior indicator among network components.

Turning now to FIG. 4, depicted is an example wireless communications network 400 that communicates a rules behavior indicator related to failure in policy rule installation and/or related bearer modification. Network 400 can include a PCRF 102 that implements policy control for a device (not shown) or a bearer thereof, as described. Network 400 additionally includes an application function 302 that communicates data over the bearer to the device through PCRF 102 and gateway 104, as described. Application function 302, for example, can serve a number of devices, and PCRF 102 can control policy, QoS, etc. for the application function 302. Gateway 104 can enforce policy control over the bearer and/or can handle bearer establishment and modification based on policy rules received from PCRF 102. In one example, application function 302 can provide service information to the PCRF 102 for implementing the policy rules for a device or related bearer.

PCRF 102 can comprise a rules behavior receiving component 402 that can obtain an indication of whether to release or utilize previous policy rules (e.g., PCC, QoS, or similar rules) if installation of a set of modified policy rules or related bearer modification fails at a gateway, and a rules behavior specifying component 404 that forwards or communicates a similar indication to the gateway. PCRF 102 additionally comprises a rules reverting component 208 that can update PCRF 102 to a previous version of the policy rules upon receiving a notification of policy rule installation failure or bearer modification failure from the gateway, and a rules removing component 406 that can release the previous version of the policy rules.

Application function 302 can include a rules behavior specifying component 408 that indicate whether to release or utilize a previous version of a set of policy rules to a PCRF. Gateway 104 comprises, for example, a rules behavior receiving component 410 that obtains an indication of whether to release or utilize previous policy rules if installation of a set of modified policy rules or related bearer modification fails at the gateway 104, a rules reverting component 412 that enforces a previous version of policy rules, and a rules removing component 414 that can release the previous version of policy rules.

According to an example, as described, application function 302 can implement new service information based at least in part on a requested service addition, modification, etc. from a device. In addition, rules behavior specifying component 408 can provide an indication to PCRF 102 of the expected behavior if policy rules cannot be installed (e.g., and/or the bearer cannot be successfully modified) to accommodate the new service information. For example, the indication can specify whether to utilize or release a previous version of the policy rules if installation of the policy rules or a related bearer modification fails. Rules behavior specifying component 408 can provide the indication to PCRF 102 with new service information, upon initially connecting thereto, as a separate message, and/or the like. In any case, rules behavior receiving component 402 can obtain the indication.

For example, the rules behavior indicator can specify to utilize the previous version of the policy rules upon modified policy rule installation and/or related bearer modification failure. Thus, for example, where gateway 104 reports that installation of a set of modified policy rules or a related bearer modification failed, as described above, rules reverting component 208 can update PCRF 102 to the previous version of the policy rules. In addition, as described above, PCRF 102 can notify application function 302 of the failure. In another example, rules removing component 406 can release the previous version of the policy rules upon receiving failure from gateway 104 where the rules behavior indicator specifies to do so. In this regard, PCRF 102 can perform substantially any other action indicated by the rules behavior indicator.

Moreover, rules behavior specifying component 404 can forward or transmit the rules behavior indicator, or a similar indication, to gateway 104. This can be sent with a set of modified rules, in one example, as described above. Rules behavior receiving component 410 can obtain the indication. Similarly, where the indication specifies to revert to a previous version of the policy rules upon failure of installation or related bearer modification and gateway 104 fails to successfully install a set of modified policy rules or modify the bearer, rules reverting component 412 can continue using the previous version of the policy rules. In addition, gateway 104 can notify PCRF 102 of the failure, and rules reverting component 406 can similarly revert to the previous version of policy rules, etc. Where the indication specifies to release the previous version of the policy rules in the case of failure, rules removing component 414 can deactivate the previous version of the policy rules and release resources related thereto, for example.

Figure 5:
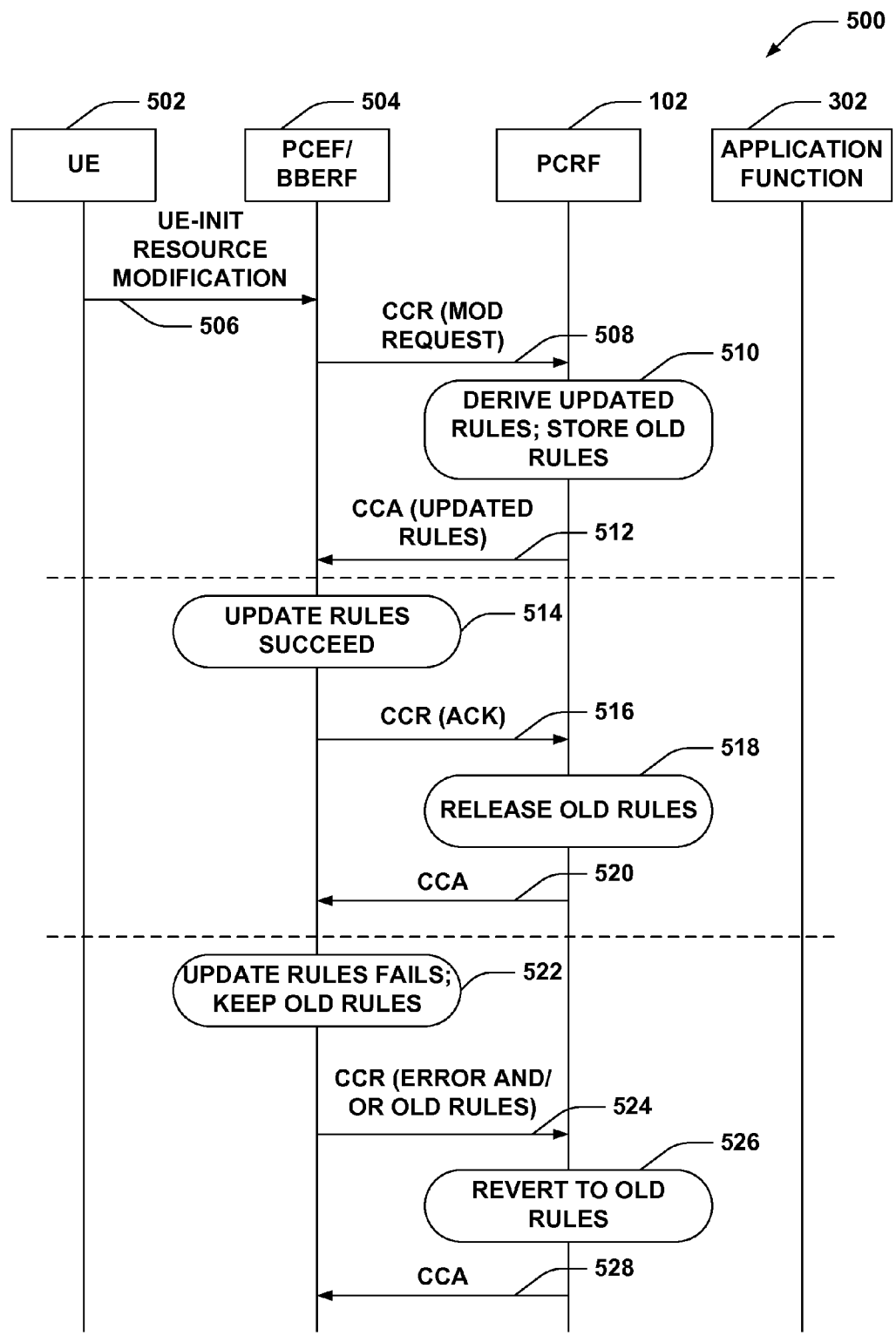
FIG. 5 illustrates an example system for reporting status of a policy rule installation and/or related bearer modification.

Referring to FIG. 5, an example wireless communication system 500 is illustrated that facilitates handling failure in updating policy rules between a PCRF and PCEF/BBERF. System 500 includes a UE 502 that can communicate with an application function 302 through a plurality of network nodes. For example, UE 502 can connect to a core wireless network via one or more eNBs, as described above, which can facilitate access to one or more core network components, such as a gateway that implements PCEF/BBERF 504, etc., over one or more bearers in the core wireless network. In addition, system 500 includes a PCRF 102 that can define policy rules (e.g., PCC, QoS, and/or other rules) for communicating over the bearer; PCEF 504 can enforce the policy rules. Moreover, BBERF 504 can manage the core network bearer for UE 502.

According to an example, UE 502 can initiate a resource modification 506 by transmitting a request to PCEF/BBERF 504, which can include a requested service or modification to the bearer, a desired QoS, and/or the like. PCEF/BBERF 504 can notify the PCRF 102 of the request by transmitting a CCR with the modification request 508 thereto. PCRF 102 can derive a set of updated policy rules and can store the old policy rules at 510, as described. In addition, PCRF 102 can transmit the updated policy rules in a CCA 512 to PCEF/BBERF 504. PCEF 504 can attempt to install the updated policy rules, and BBERF 504 can attempt to complete bearer modification in view of the updated policy rules. Updating the policy rules can succeed, as shown at 514, in one example, and PCEF/BBERF 504 can notify PCRF 102 of successful policy rules update by transmitting a CCR 516 to acknowledge. In this example, PCRF 102 can release the old policy rules 518 if previously stored. PCRF 102 can additionally acknowledge receiving the CCR by transmitting CCA 520 to PCEF/BBERF 504.

Updating the policy rules (or a different set of policy rules) can fail and the old policy rules can be kept, as shown at 522. In this example, PCEF/BBERF 504 can transmit a CCR indicating error and/or the old set of policy rules 524 to PCRF 102. PCRF 102 can revert to the old policy rules 526, whether by obtaining the stored policy rules or receiving the old policy rules in the CCR 524, as described. PCRF 102 can acknowledge receiving CCR 524 by transmitting CCA 528 to PCEF/BBERF 504, as described.

Figure 6:
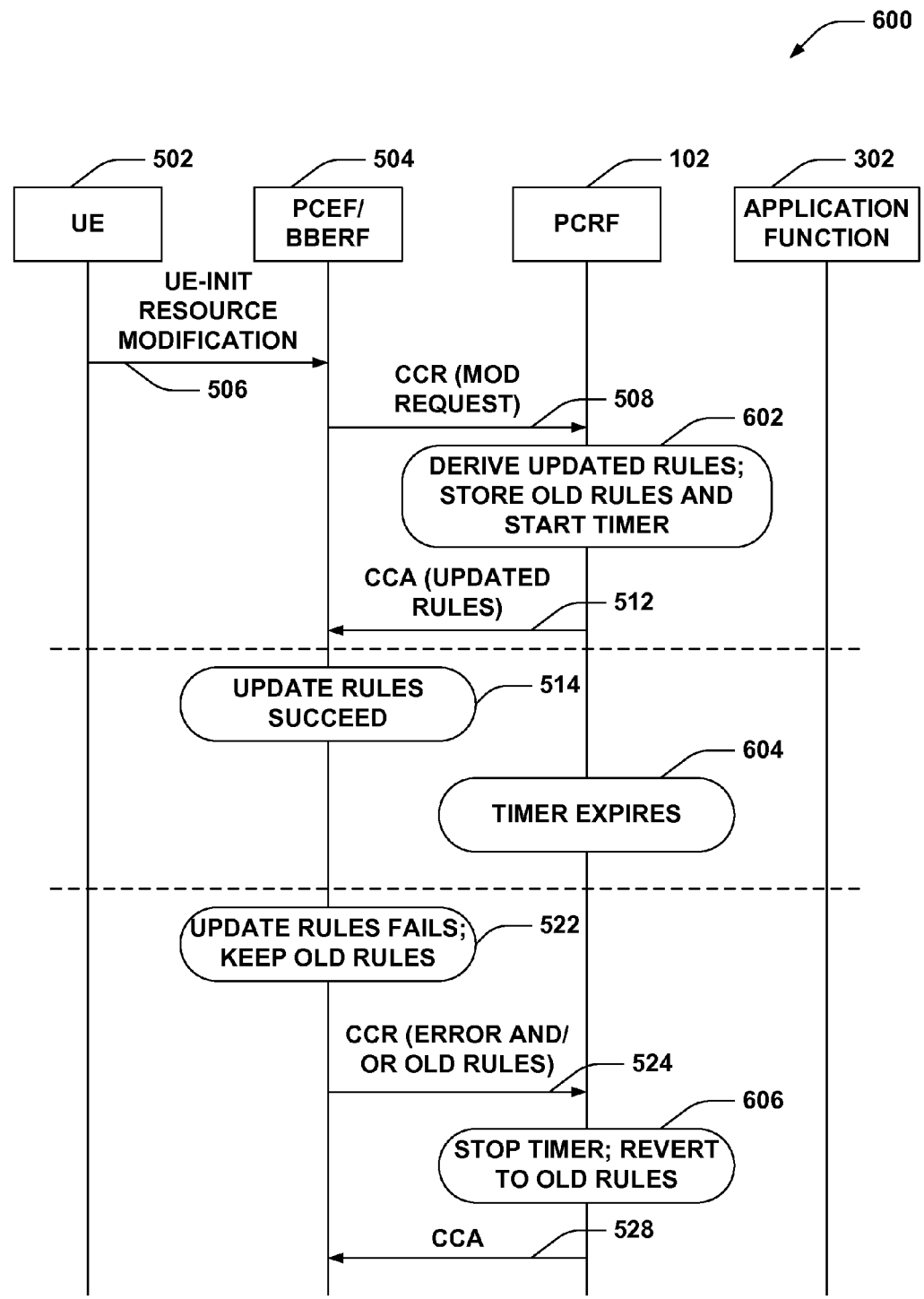
FIG. 6 illustrates an example system that facilitates determining a status of policy rule installation and/or related bearer modification according to a timer.

Referring to FIG. 6, an example wireless communication system 600 is illustrated that facilitates handling failure in updating policy rules based on a timer. System 600 includes a UE 502 that can communicate with an application function 302 through a plurality of network nodes. For example, as described, UE 502 can connect to a core wireless network via one or more eNBs, as described above, which can facilitate access to one or more core network components, such as a gateway that implements PCEF/BBERF 504, etc., over one or more bearers in the core wireless network. In addition, as described, system 600 includes a PCRF 102 that can define policy rules (e.g., PCC, QoS, and/or other rules) for communicating over the bearer; PCEF 504 can enforce the policy rules. Moreover, BBERF 504 can manage the core network bearer for UE 502.

According to an example, UE 502 can initiate a resource modification 506 by transmitting a request to PCEF/BBERF 504, which can include a requested service or modification to the bearer, a desired QoS, and/or the like. PCEF/BBERF 504 can notify the PCRF 102 of the request by transmitting a CCR with the modification request 508 thereto. PCRF 102 can derive a set of updated policy rules, store the old policy rules at 602, as described, and/or start a timer related to determining whether PCC, QoS, and/or other policy rule installation or related bearer modification succeeds. PCRF 102 can transmit the updated policy rules in a CCA 512 to PCEF/BBERF 504. PCEF 504 can attempt to install the updated policy rules, and BBERF 504 can attempt to complete bearer modification in view of the updated policy rules. Updating the policy rules can succeed, as shown at 514, in one example, and PCEF/BBERF 504 can do nothing as far as notifying PCRF 102, in this case. The timer can expire 604, and PCRF 102 can assume policy rule installation and/or related bearer modification succeeded at PCEF/BBERF 504.

Updating the policy rules (or a different set of policy rules) can fail and the old policy rules can be kept, as shown at 522. In this example, PCEF/BBERF 504 can transmit a CCR indicating error and/or the old set of policy rules 524 to PCRF 102. PCRF 102 can stop the timer and revert to the old policy rules 606, whether by obtaining the stored policy rules or receiving the old policy rules in the CCR 524, as described. PCRF 528 can acknowledge receiving CCR 524 by transmitting CCA 528 to PCEF/BBERF 504, as described.

Figure 7:
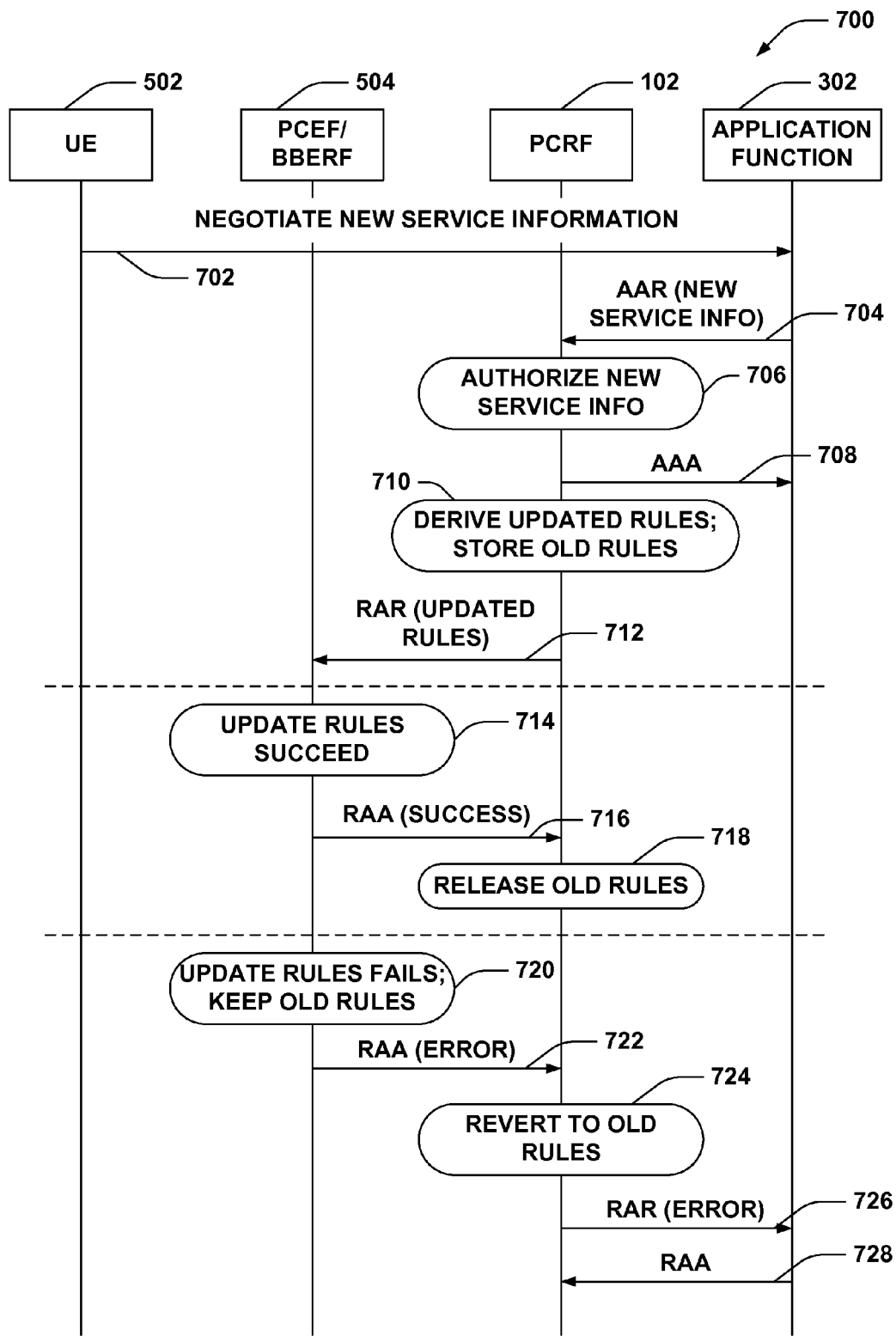
FIG. 7 illustrates an example system that facilitates notifying an application function of a policy rule installation and/or bearer modification status.

Referring to FIG. 7, an example wireless communication system 700 is illustrated that facilitates handling failure in updating policy rules pushed from a PCRF to a PCEF/BBERF. System 700 includes a UE 502 that can communicate with an application function 302 through a plurality of network nodes. For example, as described, UE 502 can connect to a core wireless network via one or more eNBs, as described above, which can facilitate access to one or more core network components, such as a gateway that implements PCEF/BBERF 504, etc., over one or more bearers in the core wireless network. In addition, system 700 includes a PCRF 102 that can define policy rules (e.g., PCC, QoS, and/or other rules) for communicating over the bearer, as described; PCEF 504 can enforce the policy rules. Moreover, BBERF 504 can manage the core network bearer for UE 502.

According to an example, UE 502 can negotiate new service information 702 with application function 302. As described, for example, UE 502 can request additional or modified services from application function 302. Application function 302 can, in response for example, transmit an authentication and authorization request (AAR) including the new service information 704 to PCRF 102. PCRF 102 can authorize the new service information 706, and transmit an authentication and authorization answer (AAA) 708 to application function 302 to acknowledge authorization of the new service information. PCRF 102 can then derive updated policy rules based on the new service information and store the old policy rules 710. PCRF 102 can transmit a re-authorization request (RAR) including the updated policy rules 712 to PCEF/BBERF 504.

As described above, PCEF/BBERF 504 can succeed or fail in installing the updated policy rules and/or completing bearer modification in view of the updated policy rules. Updating policy rules can succeed, as shown at 714, and PCEF/BBERF 504 can transmit a re-authorization answer (RAA) indicating success 716 to PCRF 102. PCRF 102 can release the old policy rules 718, if stored. Updating policy rules can alternatively fail and the old policy rules are kept, as shown at 720. In this example, PCEF/BBERF 504 can transmit an RAA reporting error 722 to PCRF 102. For example, the RAA 722 can indicate that the policy rule installation and/or bearer modification failed. PCRF 102 can revert to old policy rules 724, in this case, and can transmit a RAR indicating error 726 to application function 302. Application function 302 can acknowledge receiving the RAR 726 with an RAA 728. Application function 302 can perform one or more actions based on receiving the indicated error, such as tear down the session, continue at suboptimal QoS, revert back to previous service information, and/or the like, as described.

Figure 8:
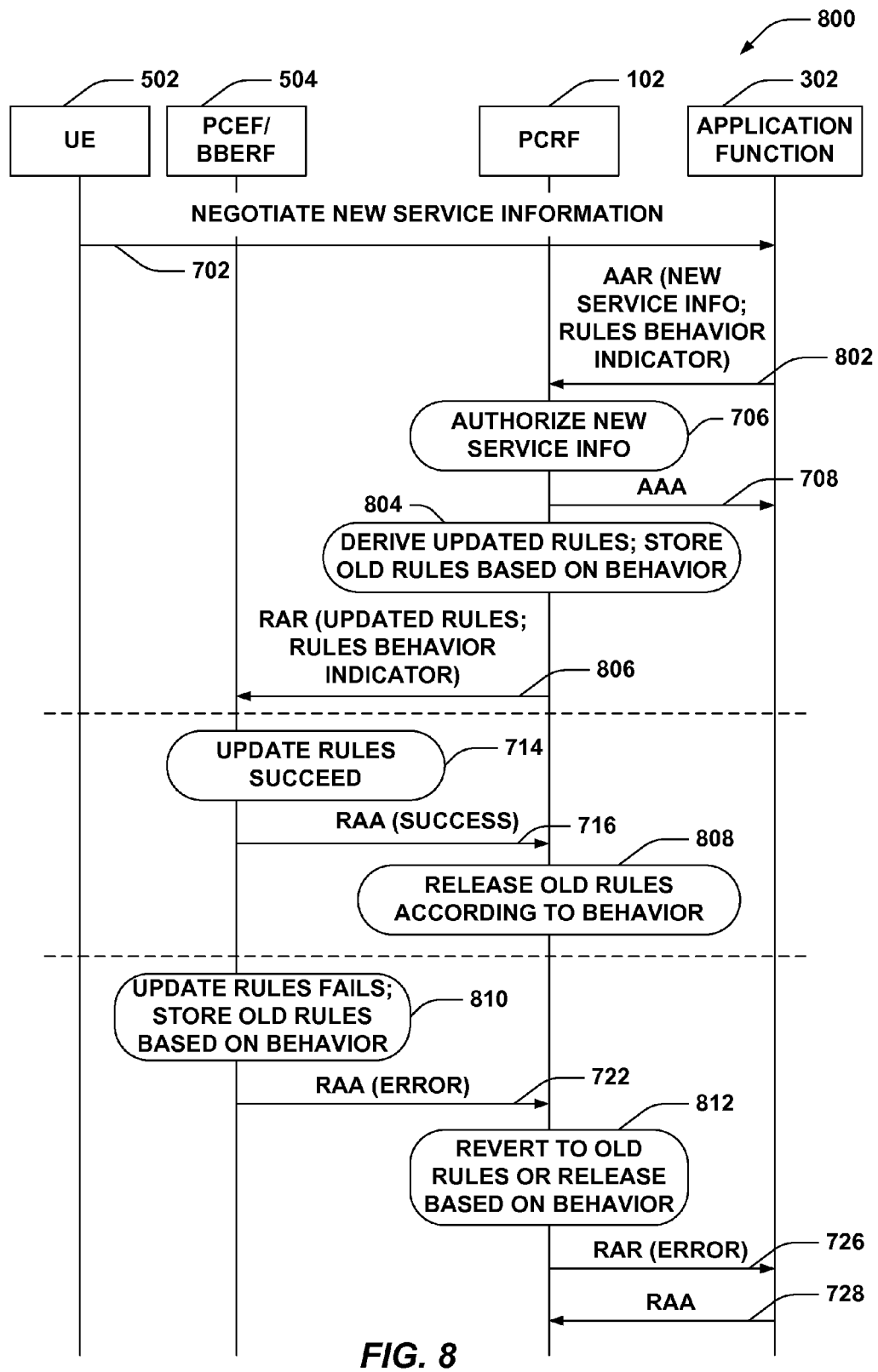
FIG. 8 illustrates an example system for communicating a rules behavior indicator.

Referring to FIG. 8, an example wireless communication system 800 is illustrated that facilitates handling failure in updating policy rules pushed from a PCRF to a PCEF/BBERF. System 800 includes a UE 502 that can communicate with an application function 302 through a plurality of network nodes. For example, as described, UE 502 can connect to a core wireless network via one or more eNBs, as described above, which can facilitate access to one or more core network components, such as a gateway that implements PCEF/BBERF 504, etc., over one or more bearers in the core wireless network. In addition, system 800 includes a PCRF 102 that can define policy rules (e.g., PCC, QoS, and/or other rules) for communicating over the bearer, as described; PCEF 504 can enforce the policy rules. Moreover, BBERF 504 can manage the core network bearer for UE 502.

According to an example, UE 502 can negotiate new service information 702 with application function 302. As described, for example, UE 502 can request additional or modified services from application function 302. Application function 302 can, in response for example, transmit an AAR including the new service information and a rules behavior indicator 802 to PCRF 102. The rules behavior indicator can relate to action at the PCRF 102 expected by application function 302 if updating policy rules to comply with the new service information fails. PCRF 102 can authorize the new service information 706, and transmit an AAA 708 to application function 302 to acknowledge authorization of the new service information. PCRF 102 can then derive updated policy rules based on the new service information and store the old policy rules or not depending on the rule behavior indication 804. PCRF 102 can transmit a RAR including the updated policy rules and/or rules behavior indicator 806 to PCEF/BBERF 504.

As described above, PCEF/BBERF 504 can succeed or fail in installing the updated policy rules and/or completing bearer modification in view of the updated policy rules. Updating policy rules can succeed, as shown at 714, and PCEF/BBERF 504 can transmit a RAA indicating success 716 to PCRF 102. PCRF 102 can release the old policy rules 808, if stored, depending on the rules behavior indicator. Updating policy rules can alternatively fail and the old policy rules are kept based on the rules behavior indicator, as shown at 810. For example, if the rules behavior indicator specifies to store the old policy rules in the case of error, then PCEF/BBERF 504 can do so. In this example, PCEF/BBERF 504 can transmit an RAA reporting error 722 to PCRF 102. For example, the RAA 722 can indicate that the policy rule installation and/or bearer modification failed. PCRF 102 can revert to old policy rules or release the old policy rules depending on the rules behavior indicator 812, in this case, and can transmit a RAR indicating error 726 to application function 302. Application function 302 can acknowledge receiving the RAR 726 with an RAA 728. Thus, in this example, PCRF 102 and PCEF/BBERF 504 behave as requested by application function 302 in the case of unsuccessful policy rule installation and/or related bearer modification.

Referring to FIGS. 9-12, example methodologies relating to handling failure in policy rule installation are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 9:
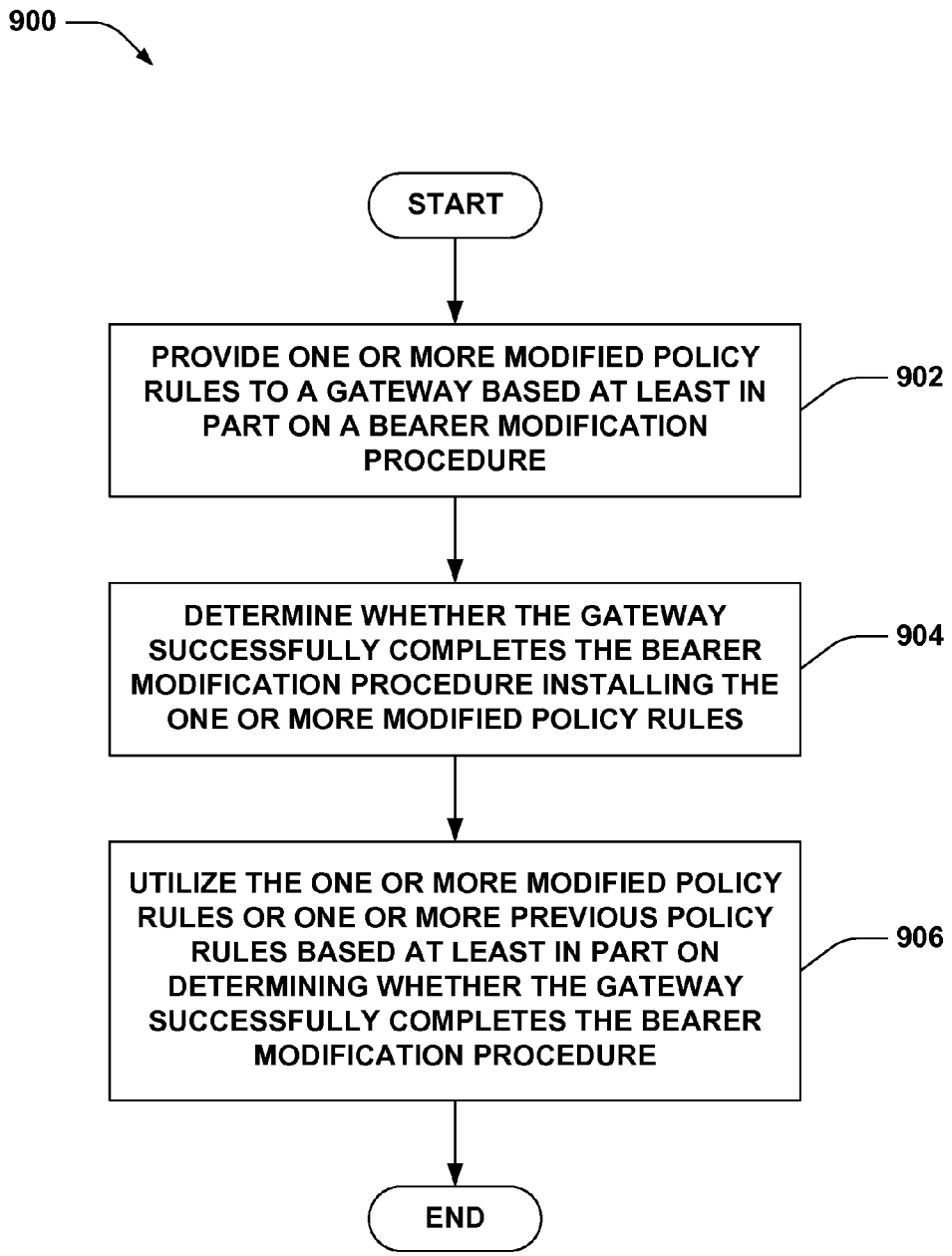
FIG. 9 illustrates an example methodology that facilitates utilizing modified or previous policy rules based on determining whether policy rule installation or related bearer modification succeeded at a gateway.

Turning to FIG. 9, an example methodology 900 is displayed that facilitates utilizing policy rules based on whether installation of modified policy rules or completion of a related bearer modification procedure is successful at a gateway. At 902, one or more modified policy rules can be provided to a gateway based at least in part on a bearer modification procedure. For example, the bearer modification procedure can be initiated by a device requesting additional services for a related bearer, an application function providing new service information for the device or the related bearer, and/or the like, as described. In addition, the policy rules can modify a previous version of the rules to allow additional resources, to modify charging rules, and/or the like. At 904, it can be determined whether the gateway successfully completes the bearer modification procedure installing the one or more modified policy rules. For example, this can include receiving an indication (e.g., in a CCR) from the gateway that indicates whether or not the bearer modification successfully completed, which can be based on a timer or otherwise, as described. At 906, the one or more modified policy rules or one or more previous policy rules can be utilized based at least in part on determining whether the gateway successfully completes the bearer modification procedure. For example, where the gateway does not successfully complete the bearer modification procedure, the one or more previous policy rules can be utilized. In one example, as described, the one or more previously policy rules can be stored upon providing the one or more modified policy rules and/or the gateway can include the one or more previous policy rules in the indication, if so provided.

Figure 10:
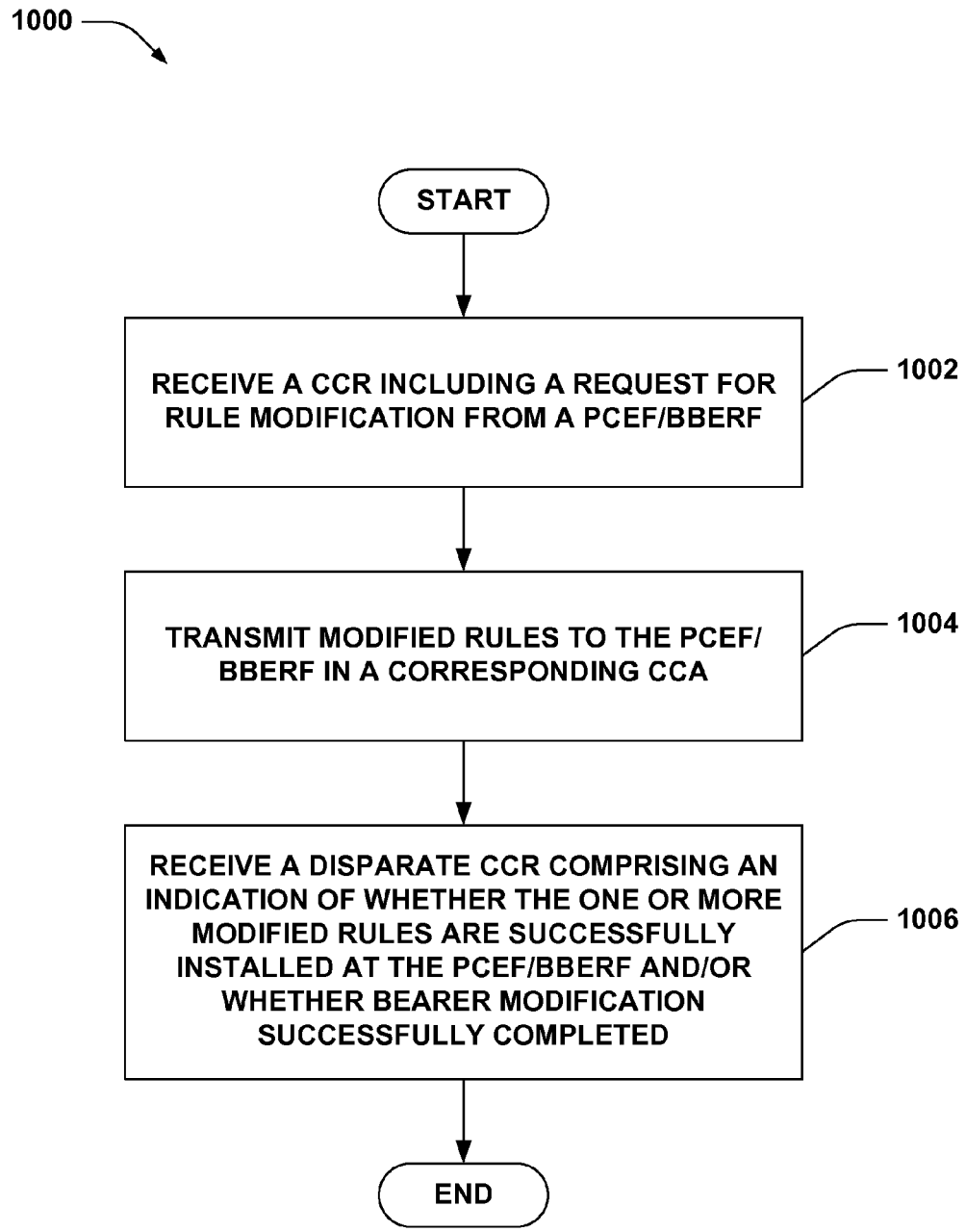
FIG. 10 illustrates an example methodology for receiving a credit control request (CCR) that specifies whether policy rule installation and/or related bearer modification succeeded.

Referring to FIG. 10, illustrated is an example methodology 1000 that uses CCR/CCA exchange to communicate failure and/or success of modified rules installation and/or a related bearer modification procedure. At 1002, a CCR including a request for rule modification from a PCEF/BBERF can be received. At 1004, modified rules can be transmitted to the PCEF/BBERF in a corresponding CCA. At 1006, a disparate CCR can be received comprising an indication of whether the one or more modified rules are successfully installed and/or whether bearer modification successfully completed. Thus, as described, the disparate CCR can include an indication of failure or success, can be evaluated to determine whether it is received before expiration of a timer, and/or the like to determine whether the PCEF/BBERF successfully installed the rules and/or completed the related bearer modification procedure.

Figure 11:
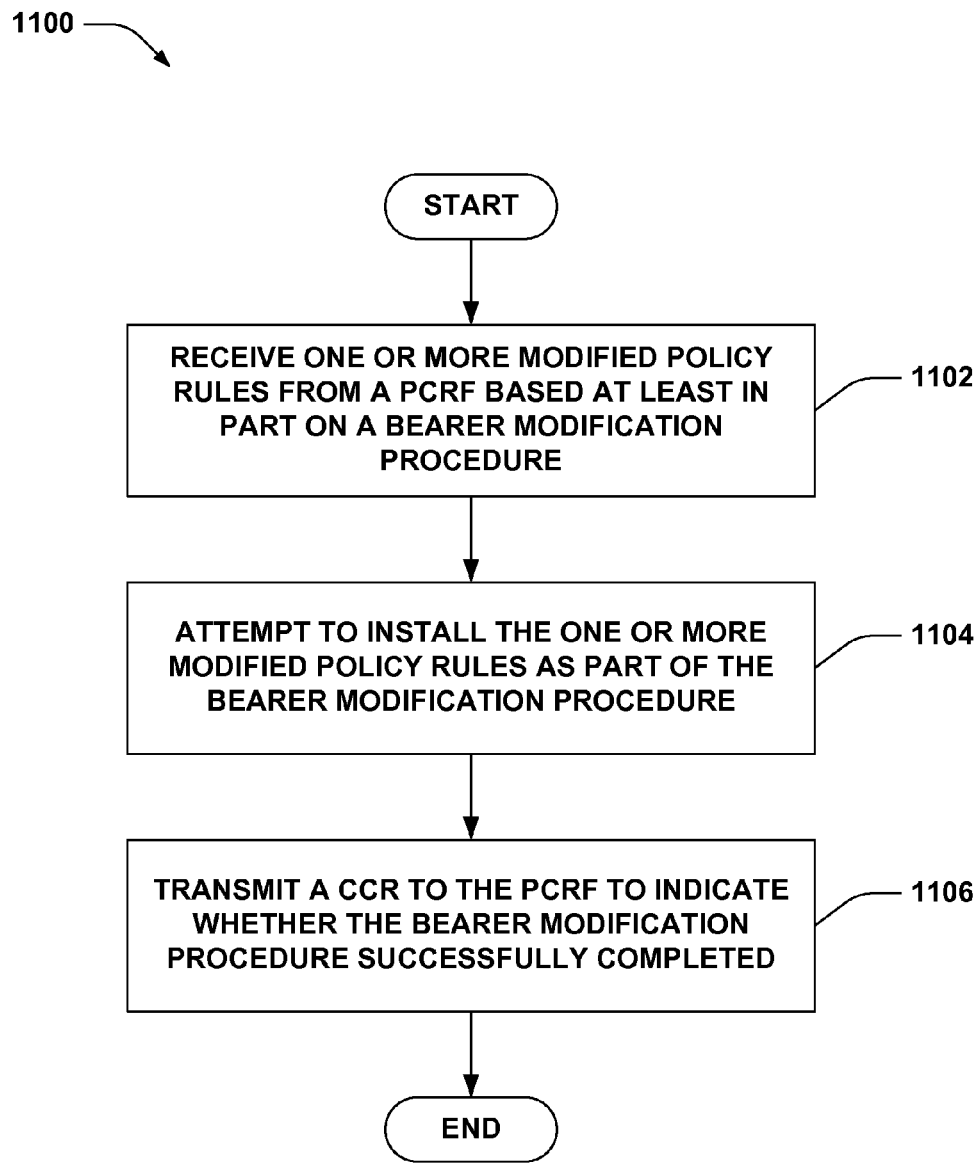
FIG. 11 illustrates an example methodology that facilitates transmitting a CCR to indicate whether policy rule installation and/or bearer modification succeeded.

Turning now to FIG. 11, an example methodology 1100 that facilitates indicating failure and/or success of policy rules installation is illustrated. At 1100, one or more modified policy rules can be received from a PCRF based at least in part on a bearer modification procedure. In one example, rule modification can be requested as part of the procedure, request from an application function to the PCRF to accommodate new services for a device, and/or the like. At 1104, installing the one or more modified policy rules can be attempted as part of the bearer modification procedure. At 1106, a CCR can be transmitted to the PCRF indicating whether the bearer modification procedure successfully completed. For example, this can include an indication of whether the rules are successfully installed. In this regard, PCRF can take appropriate action based at least in part on the indication. In addition, as described, a rules behavior indicator can be received with the one or more modified rules, in one example, and a related action can be performed where installation of the one or more modified policy rules and/or the bearer modification procedure fails.

Figure 12:
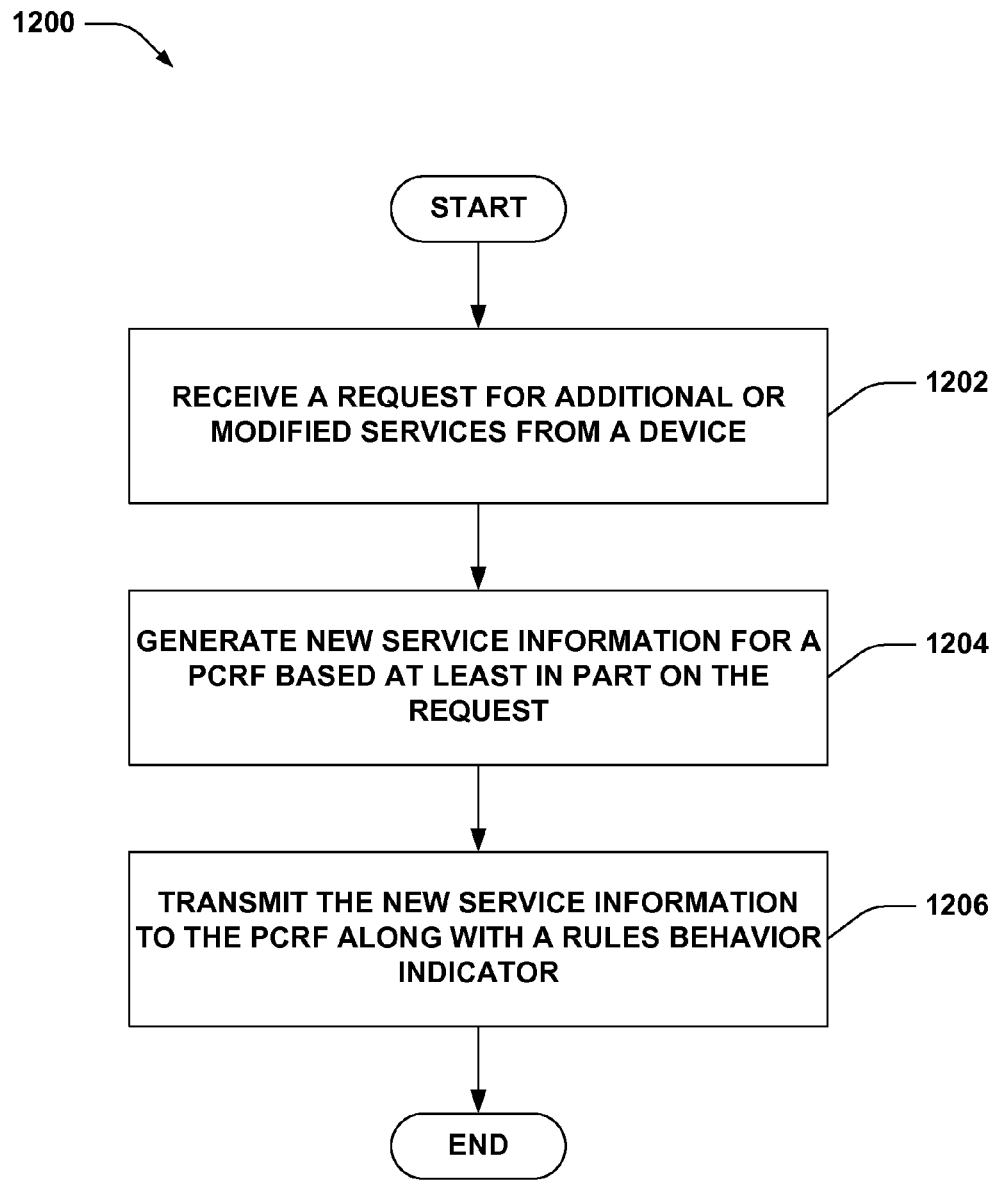
FIG. 12 illustrates an example methodology for transmitting rules behavior indicators.

Referring to FIG. 12, an example methodology 1200 is depicted that facilitates providing a rules behavior indicator with new service information to specify actions to take when a bearer modification procedure fails. At 1202, a request for additional or modified services can be received from a device. At 1204, new service information can be generated for a PCRF based at least in part on the request. As described, the new service information can indicate additional resources required for the new service, updated charging information, etc. At 1206, the new service information can be transmitted to the PCRF along with a rules behavior indicator. Thus, as described, where a bearer modification procedure fails, the PCRF can perform an action specified by the rules behavior indicator, for example.

It will be appreciated that, in accordance with one or more aspects described herein, inferences can be made regarding determining whether rule installation or a related bearer modification fails or succeeds, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
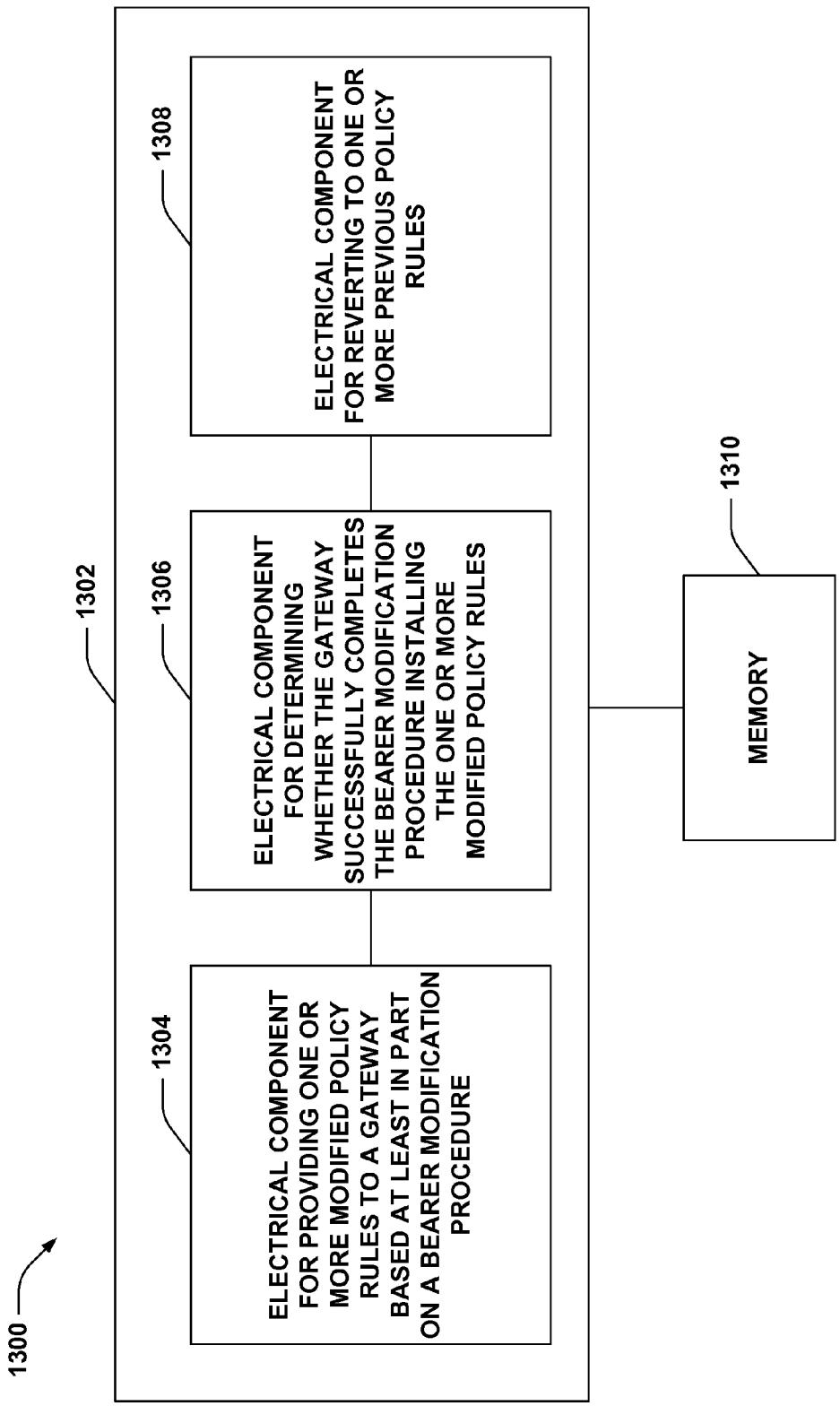
FIG. 13 illustrates an example system that facilitates reverting to previous policy rules upon receiving an indication of failed policy rule installation and/or bearer modification.

With reference to FIG. 13, illustrated is a system 1300 that reverts to previous policy rules where installation of modified rules fails. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for providing one or more modified policy rules to a gateway based at least in part on a bearer modification procedure 1304. For example, as described, the bearer modification procedure can be initiated by the gateway based at least in part on a request from a related device. In another example, the modified policy rules can be provided to the gateway based at least in part on new service information received from an application function. Further, logical grouping 1302 can comprise an electrical component for determining whether the gateway successfully completes the bearer modification procedure installing the one or more modified policy rules 1306.

As described, for example, electrical component 1306 can determine whether the gateway successfully completes the bearer modification procedure based at least in part on receiving a CCR therefrom indicating status of the bearer modification procedure and/or associated modified rule installation, receiving such an indication before expiration of a timer, and/or the like. Moreover, logical grouping 1302 can comprise an electrical component for reverting to one or more previous policy rules 1308. As described, electrical component 1308 can revert based at least in part on determining that rule installation or the related bearer modification procedure failed at the gateway. Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310.

Figure 14:
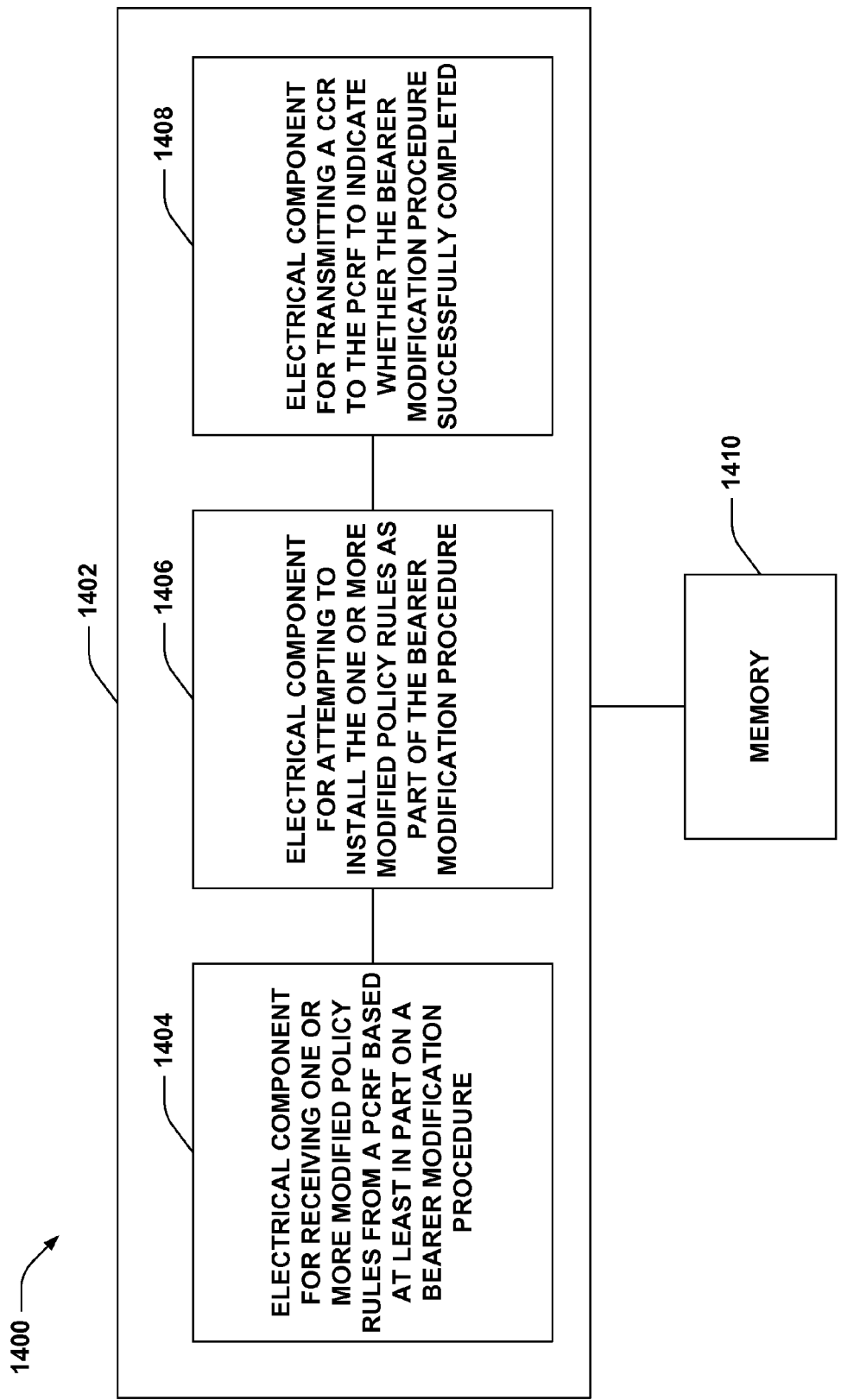
FIG. 14 illustrates an example system that facilitates transmitting a CCR to indicate whether rule installation and/or bearer modification succeeded.

With reference to FIG. 14, illustrated is a system 1400 for indicating a status of a modified rule installation and/or a related bearer modification procedure to a PCRF. For example, system 1400 can reside at least partially within a base station, mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving one or more modified policy rules from a PCRF based at least in part on a bearer modification procedure 1404. For example, as described, the bearer modification procedure can be initiated based at least in part on a request from a related device, based on receiving new service information from an application function at the PCRF, etc. Further, logical grouping 1402 can comprise an electrical component for attempting to install the one or more modified policy rules as part of the bearer modification procedure 1406. Moreover, logical grouping 1402 can comprise an electrical component for transmitting a CCR to the PCRF to indicate whether the bearer modification procedure successfully completed 1408. Additionally, system 1400 can include a memory 1410 that retains instructions for executing functions associated with the electrical components 1404, 1406, and 1408. While shown as being external to memory 1410, it is to be understood that one or more of the electrical components 1404, 1406, and 1408 can exist within memory 1410.

Figure 15:
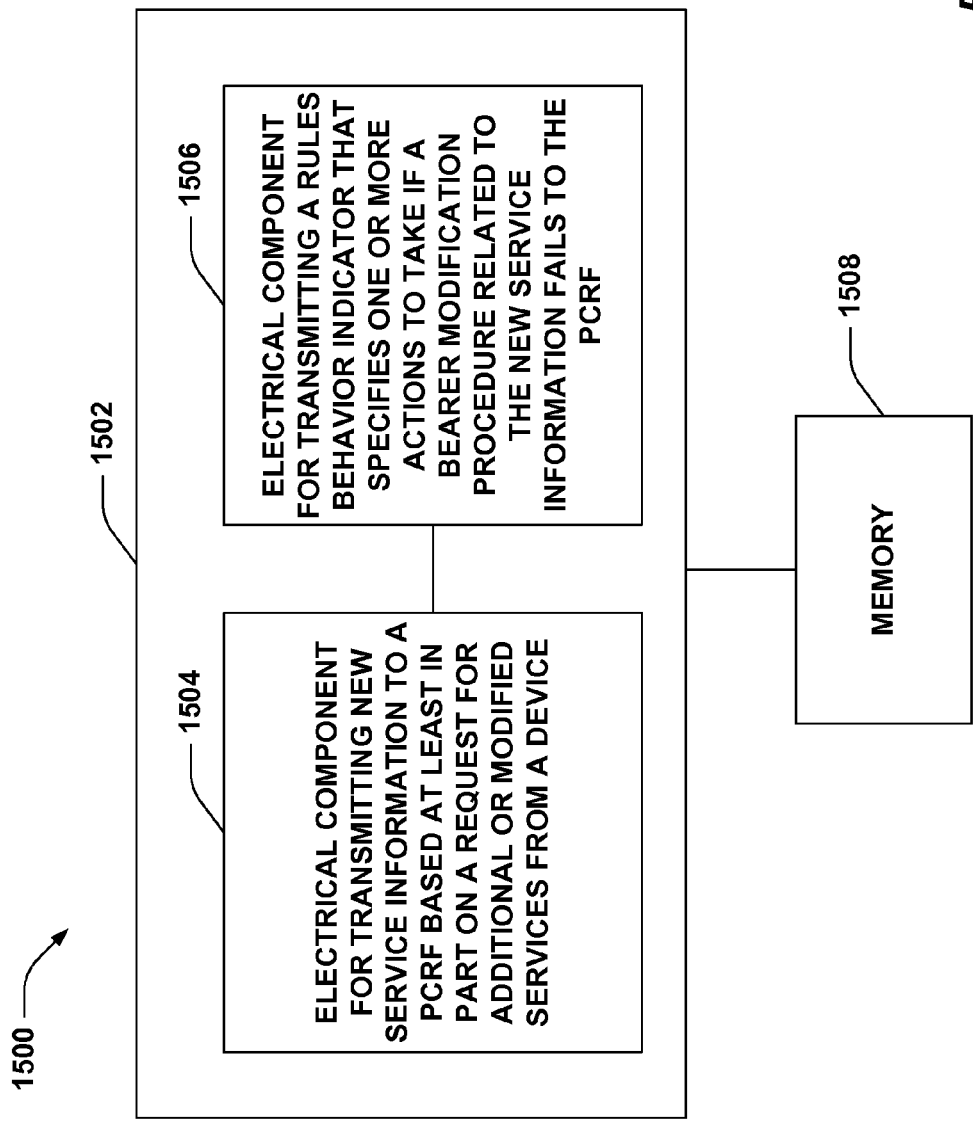
FIG. 15 illustrates an example system for transmitting rules behavior indicators.

With reference to FIG. 15, illustrated is a system 1500 that provides a rules behavior indicator to a PCRF. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for transmitting new service information to a PCRF based at least in part on a request for additional or modified services from a device 1504. For example, the new service information, as described, can relate to additional resources required for new or modified services, additional charging policies, and/or the like, as described. Further, logical grouping 1502 can comprise an electrical component for transmitting a rules behavior indicator that specifies one or more actions to take if a bearer modification procedure related to the new service fails to the PCRF 1506. Thus, as described, the PCRF can utilize this indicator to perform the specified behavior, transmit the indicator to a PCEF/BBERF, and/or the like. Additionally, system 1500 can include a memory 1508 that retains instructions for executing functions associated with the electrical components 1504 and 1506. While shown as being external to memory 1508, it is to be understood that one or more of the electrical components 1504 and 1506 can exist within memory 1508.

Figure 16:
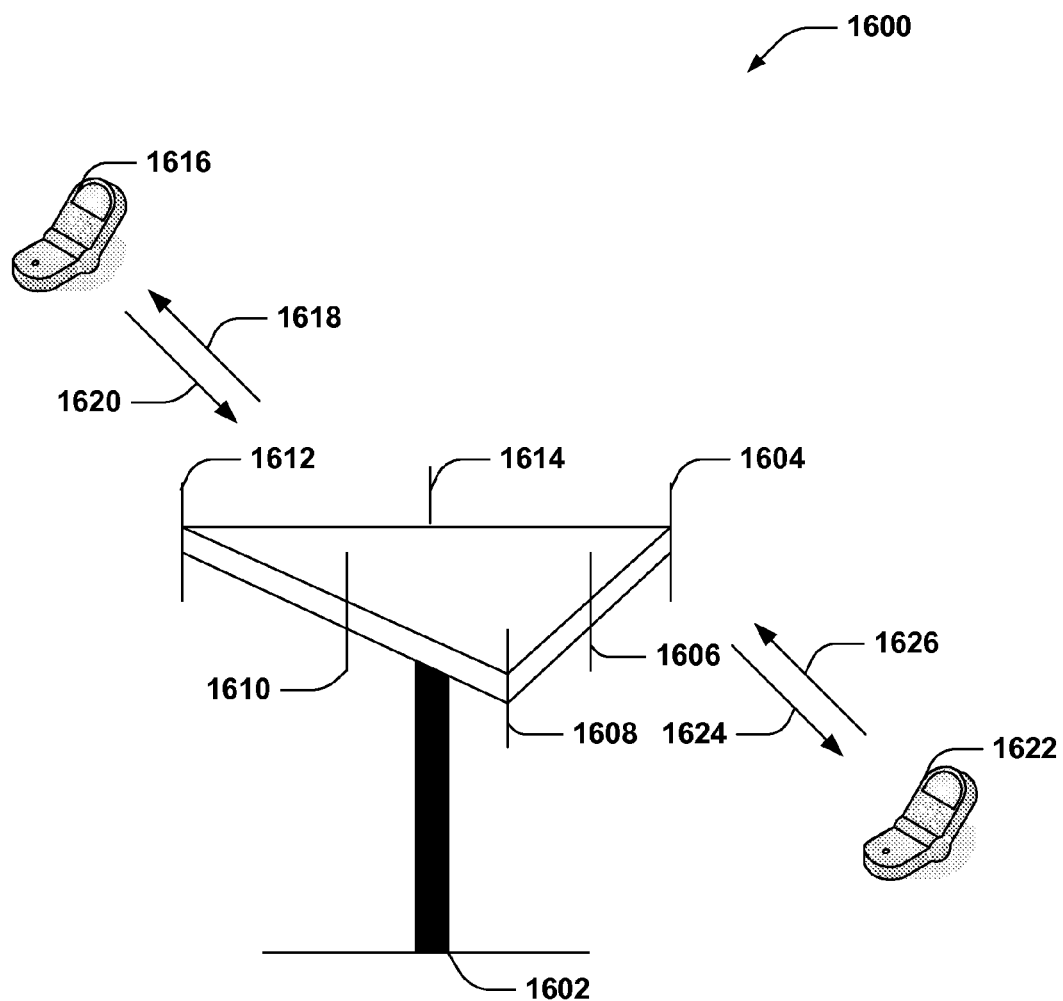
FIG. 16 is an illustration of a wireless communication system in accordance with various aspects set forth herein.

Referring now to FIG. 16, a wireless communication system 1600 is illustrated in accordance with various embodiments presented herein. System 1600 comprises a base station 1602 that can include multiple antenna groups. For example, one antenna group can include antennas 1604 and 1606, another group can comprise antennas 1608 and 1610, and an additional group can include antennas 1612 and 1614. Two antennas are illustrated for each antenna group; however, more or fewer antennas can be utilized for each group. Base station 1602 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1602 can communicate with one or more mobile devices such as mobile device 1616 and mobile device 1622; however, it is to be appreciated that base station 1602 can communicate with substantially any number of mobile devices similar to mobile devices 1616 and 1622. Mobile devices 1616 and 1622 can be, for example, cellular phones, smart phones, laptops, handheld communication devices, handheld computing devices, satellite radios, global positioning systems, PDAs, and/or any other suitable device for communicating over wireless communication system 1600. As depicted, mobile device 1616 is in communication with antennas 1612 and 1614, where antennas 1612 and 1614 transmit information to mobile device 1616 over a forward link 1618 and receive information from mobile device 1616 over a reverse link 1620. Moreover, mobile device 1622 is in communication with antennas 1604 and 1606, where antennas 1604 and 1606 transmit information to mobile device 1622 over a forward link 1624 and receive information from mobile device 1622 over a reverse link 1626. In a frequency division duplex (FDD) system, forward link 1618 can utilize a different frequency band than that used by reverse link 1620, and forward link 1624 can employ a different frequency band than that employed by reverse link 1626, for example. Further, in a time division duplex (TDD) system, forward link 1618 and reverse link 1620 can utilize a common frequency band and forward link 1624 and reverse link 1626 can utilize a common frequency band.

Each group of antennas and/or the area in which they are designated to communicate can be referred to as a sector of base station 1602. For example, antenna groups can be designed to communicate to mobile devices in a sector of the areas covered by base station 1602. In communication over forward links 1618 and 1624, the transmitting antennas of base station 1602 can utilize beamforming to improve signal-to-noise ratio of forward links 1618 and 1624 for mobile devices 1616 and 1622. Also, while base station 1602 utilizes beamforming to transmit to mobile devices 1616 and 1622 scattered randomly through an associated coverage, mobile devices in neighboring cells can be subject to less interference as compared to a base station transmitting through a single antenna to all its mobile devices. Moreover, mobile devices 1616 and 1622 can communicate directly with one another using a peer-to-peer or ad hoc technology as depicted. According to an example, system 1600 can be a multiple-input multiple-output (MIMO) communication system.

Figure 17:
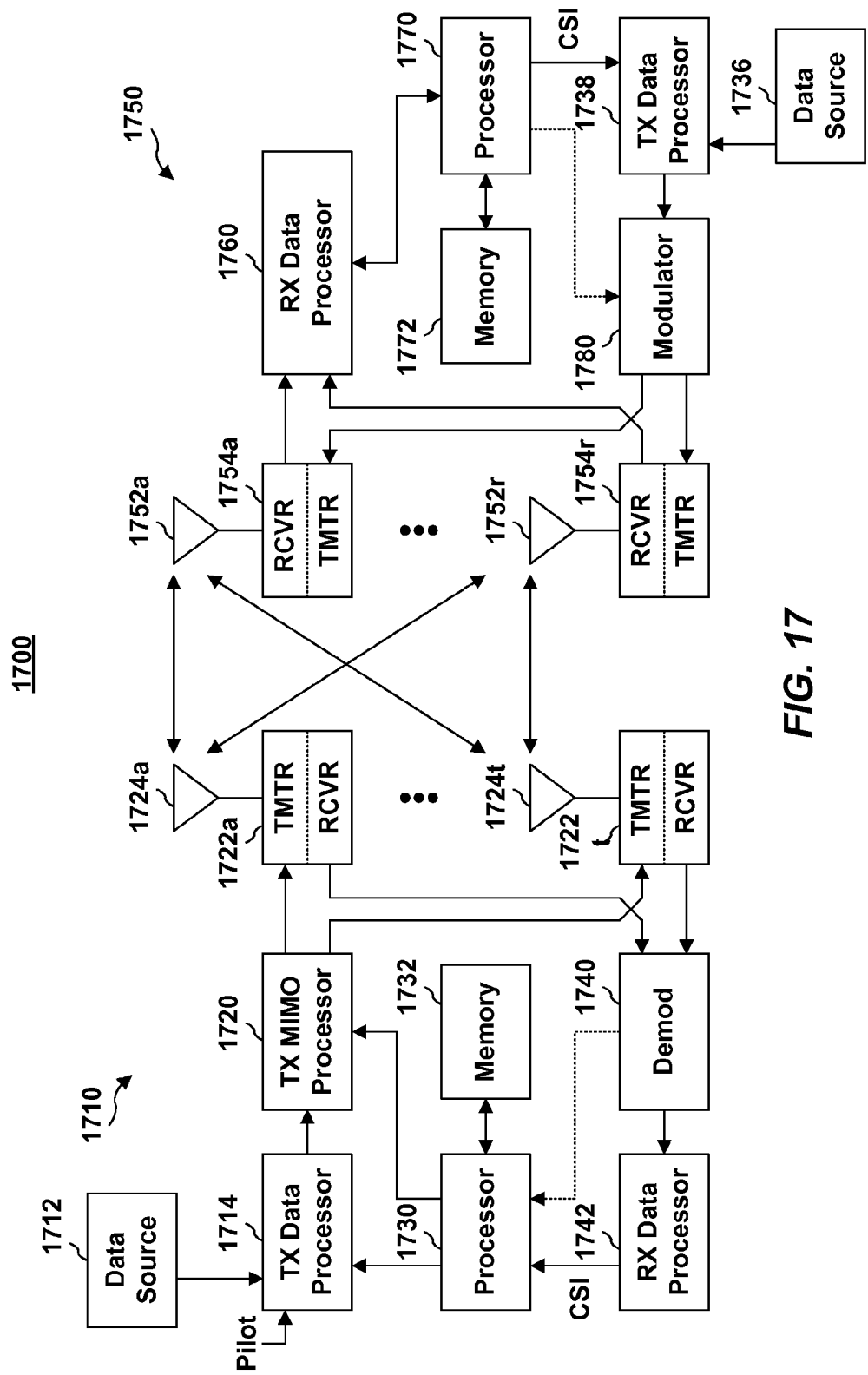
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-8 and 13-16) and/or methods (FIGS. 9-12) described herein to facilitate wireless communication there between.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides NT modulation symbol streams to NT transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1722a through 1722t are transmitted from NT antennas 1724a through 1724t, respectively.

At mobile device 1750, the transmitted modulated signals are received by NR antennas 1752a through 1752r and the received signal from each antenna 1752 is provided to a respective receiver (RCVR) 1754a through 1754r. Each receiver 1754 conditions (e.g., filters, amplifies, and down-converts) a respective signal, digitizes the conditioned signal to provide samples, and further processes the samples to provide a corresponding "received" symbol stream.

An RX data processor 1760 can receive and process the NR received symbol streams from NR receivers 1754 based on a particular receiver processing technique to provide NT "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which precoding matrix to utilize as discussed above. Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which precoding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   providing, by a policy and charging rules function (PCRF), one or more modified policy rules to a gateway based at least in part on a bearer modification procedure, wherein the bearer modification procedure is configured to update one or more current policy rules of the gateway to the one or more modified policy rules by installing the one or more modified policy rules at the gateway;
   storing, by the PCRF, one or more previous policy rules in a memory based on providing the one or more modified policy rules to the gateway;
   determining, by the PCRF, whether the gateway has failed to install the one or more modified policy rules; and
   updating, by the PCRF, the one or more current policy rules of the gateway to the one or more previous policy rules stored in the memory based on the PCRF determining that the gateway has failed to install the one or more modified policy rules.

2. The method of claim 1, further comprising:
   receiving a credit control request (CCR) from the gateway requesting the one or more modified policy rules, wherein the providing the one or more modified policy rules includes communicating the one or more modified policy rules to the gateway in a credit control answer (CCA).

3. The method of claim 2, further comprising:
   receiving a disparate CCR from the gateway related to installing the one or more modified policy rules at the gateway, wherein the determining is based at least in part on the disparate CCR.

4. The method of claim 3, wherein the disparate CCR includes the one or more previous policy rules.

5. The method of claim 1, further comprising:
   initializing a timer upon providing the one or more modified policy rules to the gateway, wherein the determining is based at least in part on determining whether a credit control request (CCR) is received from the gateway in response to receiving the one or more modified policy rules at the gateway before expiration of the timer.

6. The method of claim 1, further comprising:
   receiving new service information from an application function; and
   generating, the one or more modified policy rules based at least in part on the new service information.

7. The method of claim 6, further comprising:
   notifying the application function that the one or more modified policy rules failed to install at the gateway.

8. The method of claim 7, further comprising:
   receiving a rules behavior indicator from the application function that specifies one or more actions to perform if the bearer modification procedure fails.

9. The method of claim 8, further comprising:
   providing the rules behavior indicator to the gateway.

10. The method of claim 8, wherein the rules behavior indicator specifies, upon a determination that the gateway has failed to install the one or more modified policy rules, whether the PCRF is to update the one or more current policy rules to the one or more previous policy rules stored by the PCRF or the PCRF is to release the previous policy rules stored by the PCRF.

11. The method of claim 1, further comprising:
    removing the one or more previous policy rules stored by the PCRF based on a determination that the gateway has successfully installed the one or more modified policy rules.

12. A wireless communications apparatus, comprising:
    at least one processor configured to execute a policy and charging rules function (PCRF) to:
    provide one or more modified policy rules to a gateway based on a bearer modification procedure, wherein the bearer modification procedure is configured to update one or more current policy rules of the gateway to the one or more modified policy rules by installing the one or more modified policy rules at the gateway;
    store one or more previous policy rules based on the at least one processor providing the one or more modified policy rules to the gateway;

determine whether the gateway has failed to install the one or more modified policy rules; and updating the one or more current policy rules of the gateway to the one or more previous policy rules based on the at least one processor determining that the gateway has failed to install the one or more modified policy rules; and a memory coupled to the at least one processor, wherein the at least one processor is configured to store the one or more previous policy rules in the memory.

13. An apparatus, comprising:

means for providing one or more modified policy rules to a gateway based on a bearer modification procedure, wherein the bearer modification procedure is configured to update one or more current policy rules of the gateway to the one or more modified policy rules by installing the one or more modified policy rules at the gateway;

means for storing one or more previous policy rules in a memory based on providing the one or more modified policy rules to the gateway;

means for determining whether the gateway has failed to install the one or more modified policy rules; and means for updating the one or more current policy rules of the gateway to the one or more previous policy rules stored in the memory based at least in part on the means for determining indicating that the gateway has failed to install the one or more modified policy rules.

14. A non-transitory computer-readable medium, comprising:

code for causing at least one computer to provide one or more modified policy rules to a gateway based on a bearer modification procedure, wherein the bearer modification procedure is configured to update one or more current policy rules of the gateway to the one or more modified policy rules by installing the one or more modified policy rules at the gateway;

code for causing the at least one computer to store one or more previous policy rules in a memory based on the at least one computer providing the one or more modified policy rules to the gateway;

code for causing the at least one computer to determine whether the gateway has failed to install the one or more modified policy rules; and code for causing the at least one computer to update the one or more current policy rules of the gateway to the one or more previous policy rules stored in the memory based on the at least one computer determining that the gateway has failed to install the one or more modified policy rules.

15. An apparatus, comprising:

a rules provisioning component that provides one or more modified policy rules to a gateway based on a bearer modification procedure, wherein the bearer modification procedure is configured to update one or more current policy rules of the gateway to the one or more modified policy rules by installing the one or more modified policy rules at the gateway;

a rules reverting component that stores one or more previous policy rules in a memory based on the rules provisioning component providing the one or more modified policy rules to the gateway; and a modifying status receiving component comprising hardware that determines whether the gateway has failed to install the one or more modified policy rules, wherein the rules reverting component updates the one or more current policy rules of the gateway to the one or more previous policy rules stored in the memory based on the modifying status receiving component determining that the gateway has failed to install the one or more modified policy rules.

16. The apparatus of claim 15, wherein the rules provisioning component provides the one or more modified policy rules to the gateway in a credit control answer (CCA) based on a credit control request (CCR) received from the gateway as part of the bearer modification procedure.

17. The apparatus of claim 16, wherein the modifying status receiving component obtains a disparate CCR from the gateway related to installing the one or more modified policy rules at the gateway and determines whether the gateway has failed to install the one or more modified policy rules based on the disparate CCR.

18. The apparatus of claim 17, wherein the disparate CCR includes the one or more previous policy rules.

19. The apparatus of claim 15, wherein the modifying status receiving component initializes a timer when the rules updating component provides the one or more modified policy rules to the gateway and determines whether the gateway has failed to install the one or more modified policy rules based on whether a credit control request (CCR) is received before expiration of the timer.

20. The apparatus of claim 15, further comprising a new service receiving component that obtains new service information from an application function, wherein the rules updating component generates the one or more modified policy rules based at least in part on the new service information.

21. The apparatus of claim 20, further comprising a modifying status communicating component that notifies the application function when installation of the one or more modified policy rules fails.

22. The apparatus of claim 15, further comprising a rules behavior receiving component that obtains a rules behavior indicator from the application function that specifies one or more actions to perform where the bearer modification procedure fails.

23. The apparatus of claim 22, further comprising a rules behavior specifying component that communicates the rules behavior indicator to the gateway.

24. The apparatus of claim 23, wherein the rules behavior indicator specifies, upon a determination that the gateway has failed to install the one or more modified policy rules, whether the rules reverting component is to update the one or more current policy rules to the one or more previous policy rules stored in the memory or the rules reverting component is to release the previous policy rules stored in the memory.

25. The apparatus of claim 15, wherein the rules reverting component removes the one or more previous policy rules from the memory based at least in part on the modifying status receiving component determining that the gateway has successfully installed the one or more modified polity rules.

26. A method, comprising:

receiving, by a gateway, one or more modified policy rules from a policy and charging rules function (PCRF) based on a bearer modification procedure, wherein the bearer modification procedure is configured to update one or more current policy rules of the gateway to the one or more modified policy rules by installing the one or more modified policy rules at the gateway;

attempting, by the gateway, to install the one or more modified policy rules as part of the bearer modification procedure; and transmitting, by the gateway, when the gateway fails to install the one or more modified policy rules as part of the bearer modification procedure, a credit control request (CCR) to the PCRF to indicate that the bearer modification procedure has failed,
wherein the CCR causes the PCRF to update the one or more current policy rules of the gateway to one or more previous policy rules stored by the PCRF in a memory.

27. The method of claim 26, further comprising transmitting a disparate CCR to the PCRF to request rule modification as part of the bearer modification procedure, wherein the receiving the one or more modified policy rules includes receiving the one or more modified policy rules in a corresponding credit control answer (CCA).

28. The method of claim 26, further comprising generating the CCR to include the one or more previous policy rules.

29. The method of claim 26, further comprising receiving a rules behavior indicator that specifies one or more actions to perform if the bearer modification procedure fails.

30. A wireless communications apparatus, comprising:
at least one processor configured to:
receive one or more modified policy rules from a policy and charging rules function (PCRF) based on a bearer modification procedure, wherein the bearer modification procedure is configured to update one or more current policy rules of a gateway to the one or more modified policy rules by installing the one or more modified policy rules at the gateway;
attempt to install the one or more modified policy rules as part of the bearer modification procedure; and
transmit a credit control request (CCR) to the PCRF, when the at least one processor fails to install the one or more modified policy rules as part of the bearer modification procedure, to indicate that the bearer modification procedure has failed; and
a memory coupled to the at least one processor, wherein the CCR causes the PCRF to update the one or more current policy rules of the gateway to one or more previous policy rules stored by the PCRF in the memory.

31. An apparatus, comprising:
means for receiving one or more modified policy rules from a policy charging and rules function (PCRF) based on a bearer modification procedure, wherein the bearer modification procedure is configured to update one or more current policy rules of a gateway to the one or more modified policy rules by installing the one or more modified policy rules at the gateway;
means for attempting to install the one or more modified policy rules as part of the bearer modification procedure; and
means for transmitting a credit control request (CCR) to the PCRF, when the means for attempting fails to install the one or more modified policy rules as part of the bearer modification procedure, to indicate that the bearer modification procedure has failed;
wherein the CCR causes the PCRF to update the one or more current policy rules of the gateway to one or more previous policy rules stored by the PCRF in a memory.

32. A computer program product, comprising:
a non-transitory computer-readable medium, comprising:
code for causing at least one computer to obtain one or more modified policy rules from a policy and charging rules function (PCRF) based on a bearer modification procedure, wherein the bearer modification procedure is configured to update one or more current policy rules of a gateway to the one or more modified policy rules by installing the one or more modified policy rules at the gateway;
code for causing the at least one computer to attempt to install the one or more modified policy rules as part of the bearer modification procedure; and
code for causing the at least one computer to transmit a credit control request (CCR) to the PCRF, when the at least one computer fails to install the one or more modified policy rules as part of the bearer modification procedure, to indicate that the bearer modification procedure has failed,
wherein the CCR causes the PCRF to update the one or more current policy rules of the gateway to one or more previous policy rules stored by the PCRF in a memory.

33. An apparatus, comprising:
a rules receiving component that obtains one or more modified policy rules from a policy and charging rules function (PCRF) based on a bearer modification procedure, wherein the bearer modification procedure is configured to update one or more current policy rules of a gateway to the one or more modified policy rules by installing the one or more modified policy rules at the gateway;
a rules modifying component comprising hardware that attempts to install the one or more modified policy rules as part of the bearer modification procedure; and
a modifying status communicating component that transmits a credit control request (CCR) to the PCRF, when the rule modifying component fails to install the one or more modified policy rules as part of the bearer modification procedure, to indicate that the bearer modification procedure has failed,
wherein the CCR causes the PCRF to update the one or more current policy rules of the gateway to one or more previous policy rules stored by the PCRF in a memory.

34. The apparatus of claim 33, wherein the rules receiving component receives the one or more modified policy rules in a credit control answer (CCA) in response to a disparate CCR requesting rule modification.

35. The apparatus of claim 33, wherein the modifying status communicating component generates the CCR to include the one or more previous policy rules.

36. The apparatus of claim 33, further comprising a rules behavior receiving component that obtains a rules behavior indicator specifying one or more actions to perform where the bearer modification procedure fails.

\* \* \* \* \*